United States Patent
Glukhovsky et al.

(10) Patent No.: US 10,500,123 B2
(45) Date of Patent: Dec. 10, 2019

(54) APPARATUS AND METHODS FOR SUPPORT TRACK AND POWER RAIL SWITCHING IN A BODY WEIGHT SUPPORT SYSTEM

(71) Applicant: Bioness Inc., Valencia, CA (US)

(72) Inventors: Arkady Glukhovsky, Valencia, CA (US); Todd Cushman, Coto de Caza, CA (US); Augustine Smith, Altadena, CA (US)

(73) Assignee: Bioness Inc., Valencia, CA (US)

( * ) Notice: Subject to any disclaimer, the term of this patent is extended or adjusted under 35 U.S.C. 154(b) by 170 days.

(21) Appl. No.: 15/349,390

(22) Filed: Nov. 11, 2016

(65) Prior Publication Data

US 2017/0128313 A1    May 11, 2017

Related U.S. Application Data

(60) Provisional application No. 62/254,088, filed on Nov. 11, 2015.

(51) Int. Cl.
*A61H 3/00* (2006.01)
*B60M 1/32* (2006.01)
(Continued)

(52) U.S. Cl.
CPC ............... *A61H 3/008* (2013.01); *B60M 1/32* (2013.01); *E01B 25/26* (2013.01); *A61G 7/1042* (2013.01);
(Continued)

(58) Field of Classification Search
CPC .......... A61G 7/1042; A61H 2201/1207; A61H 2201/5007; A61H 2201/5064;
(Continued)

(56) References Cited

U.S. PATENT DOCUMENTS

| 764,781 A | 7/1904 | Sumner |
|---|---|---|
| 895,055 A | 8/1908 | Spooner |

(Continued)

FOREIGN PATENT DOCUMENTS

| CH | 669780 A5 | 4/1989 |
|---|---|---|
| CN | 104308861 B | 1/2015 |

(Continued)

OTHER PUBLICATIONS

Extended European Search Report for European Application No. 14740676.3, dated Aug. 18, 2016, 6 pages.

(Continued)

*Primary Examiner* — Mark T Le
(74) *Attorney, Agent, or Firm* — Cooley LLP

(57) ABSTRACT

A body weight support system includes a support track configured to movably suspend a trolley therefrom. A power rail of the system is coupled to the support track and is in electrical contact with the trolley. A switch included in the system has a support track portion and a power rail portion. The switch is configured to transition between a first configuration, in which a first portion of the support track and the support track portion of the switch define a first path, and a second configuration, in which a second portion of the support track and the support track portion of the switch define a second path. The trolley is configured to receive a flow of electric power from at least one of the power rail or the power rail portion of the switch that is operable to move the trolley along the first path or the second path.

18 Claims, 13 Drawing Sheets

(51) Int. Cl.
*E01B 25/26* (2006.01)
*A61G 7/10* (2006.01)

(52) U.S. Cl.
CPC ............... *A61H 2201/1207* (2013.01); *A61H 2201/5007* (2013.01); *A61H 2201/5064* (2013.01); *A61H 2201/5092* (2013.01); *A61H 2201/5097* (2013.01)

(58) Field of Classification Search
CPC .... A61H 2201/5092; A61H 2201/5097; A61H 3/008; B60M 1/32; B60M 1/30; E01B 25/26; B60L 9/00; B61L 3/185
USPC ............................ 104/102, 130.06; 191/45 A
See application file for complete search history.

(56) References Cited

U.S. PATENT DOCUMENTS

| | | | |
|---|---|---|---|
| 1,536,766 A | 5/1925 | Cammann | |
| 1,648,930 A | 11/1927 | Zouck | |
| 1,971,294 A | 8/1934 | Bunker | |
| 2,211,220 A | 8/1940 | Verplanck | |
| 2,360,505 A | 10/1944 | Medenwald et al. | |
| 2,519,165 A * | 8/1950 | Weise | H01R 41/00 191/45 A |
| 2,688,933 A * | 9/1954 | Spafford | B61L 23/005 104/130.06 |
| 2,819,755 A | 1/1958 | Berger et al. | |
| 3,424,458 A | 1/1969 | Hopps, Jr. | |
| 3,720,172 A | 3/1973 | Dehne | |
| 3,780,663 A | 12/1973 | Pettit | |
| 3,985,082 A | 10/1976 | Barac | |
| 4,243,147 A | 1/1981 | Twitchell et al. | |
| 4,360,307 A | 11/1982 | Larsson | |
| 4,372,452 A | 2/1983 | McCord | |
| 4,427,398 A | 1/1984 | Eisbrecher et al. | |
| 4,606,082 A | 8/1986 | Kuhlman | |
| 4,627,119 A | 12/1986 | Hachey et al. | |
| 4,639,955 A | 2/1987 | Carminati et al. | |
| 4,706,782 A | 11/1987 | Spoeler et al. | |
| 4,944,056 A | 7/1990 | Schroeder et al. | |
| 5,048,822 A | 9/1991 | Murphy | |
| 5,138,953 A | 8/1992 | Horcher et al. | |
| 5,337,908 A | 8/1994 | Beck, Jr. | |
| 5,490,293 A | 2/1996 | Nilsson | |
| 5,511,486 A | 4/1996 | Pollard et al. | |
| 5,632,206 A | 5/1997 | Summa et al. | |
| 5,638,755 A | 6/1997 | Love et al. | |
| 5,695,432 A | 12/1997 | Soderlund | |
| 5,809,591 A | 9/1998 | Capaldi et al. | |
| 5,850,928 A | 12/1998 | Kahlman et al. | |
| 5,904,099 A | 5/1999 | Danneker | |
| 6,080,087 A | 6/2000 | Bingham | |
| 6,192,803 B1 | 2/2001 | Nishino | |
| 6,315,138 B1 | 11/2001 | Dyson | |
| 6,464,208 B1 | 10/2002 | Smith | |
| 6,520,484 B1 | 2/2003 | Shimizu et al. | |
| 6,645,126 B1 | 11/2003 | Martin et al. | |
| 6,679,185 B2 | 1/2004 | Sullivan et al. | |
| 6,890,288 B2 | 5/2005 | Bingham | |
| 7,137,771 B2 | 11/2006 | Maurer et al. | |
| 7,240,621 B2 | 7/2007 | Chepurny et al. | |
| 7,303,049 B1 | 12/2007 | Greenlee | |
| 7,377,377 B2 | 5/2008 | Christiansson | |
| 7,462,138 B2 | 12/2008 | Shetty et al. | |
| 7,618,223 B1 | 11/2009 | Begley | |
| 7,883,450 B2 | 2/2011 | Hidler | |
| 7,938,757 B1 | 5/2011 | Cockrell | |
| 7,993,248 B1 | 8/2011 | Rasmussen | |
| 8,397,320 B2 | 3/2013 | Capaldi | |
| 8,584,274 B2 | 11/2013 | Hushek | |
| 8,789,682 B2 | 7/2014 | Fisher | |
| 8,978,905 B2 | 3/2015 | Bergenstrale et al. | |
| 9,510,991 B2 | 12/2016 | Stockmaster et al. | |
| 9,682,000 B2 | 6/2017 | Glukhovsky | |
| 9,839,569 B2 | 12/2017 | Behnke et al. | |
| 9,855,177 B2 | 1/2018 | Erturk et al. | |
| 2001/0027149 A1 | 10/2001 | Bingham | |
| 2003/0084508 A1 | 5/2003 | Faucher et al. | |
| 2003/0146069 A1 | 8/2003 | Kaiser | |
| 2003/0153438 A1 | 8/2003 | Gordon et al. | |
| 2003/0200607 A1 | 10/2003 | Faucher et al. | |
| 2003/0201374 A1 | 10/2003 | Faucher et al. | |
| 2004/0074414 A1 | 4/2004 | Phillips | |
| 2004/0143198 A1 | 7/2004 | West | |
| 2004/0200795 A1 | 10/2004 | Summa | |
| 2005/0115914 A1 | 6/2005 | Chepurny et al. | |
| 2006/0189453 A1 | 8/2006 | Leblond | |
| 2006/0229167 A1 | 10/2006 | Kram et al. | |
| 2006/0240952 A1 | 10/2006 | Schlosser | |
| 2007/0004567 A1 | 1/2007 | Shetty et al. | |
| 2008/0287268 A1 | 11/2008 | Hidler | |
| 2009/0308828 A1 | 12/2009 | Hansen | |
| 2010/0000546 A1 | 1/2010 | Park | |
| 2010/0312152 A1 | 12/2010 | Sarkodie-Gyan et al. | |
| 2011/0000015 A1 | 1/2011 | Faucher et al. | |
| 2011/0072580 A1 | 3/2011 | Imhoff | |
| 2011/0265260 A1 | 11/2011 | Darrow | |
| 2012/0000876 A1 | 1/2012 | Bergenstrale et al. | |
| 2012/0018249 A1 | 1/2012 | Mehr | |
| 2012/0198612 A1 | 8/2012 | Tindall | |
| 2012/0325586 A1 | 12/2012 | Meggs et al. | |
| 2014/0206503 A1 | 7/2014 | Stockmaster et al. | |
| 2015/0143627 A1 | 5/2015 | McBride | |
| 2015/0238816 A1 | 8/2015 | Naderer et al. | |
| 2015/0283921 A1 | 10/2015 | Zimmerman et al. | |
| 2018/0036196 A1 | 2/2018 | Behnke et al. | |
| 2018/0071159 A1 | 3/2018 | Glukhovsky et al. | |

FOREIGN PATENT DOCUMENTS

| | | |
|---|---|---|
| DE | 102008015879 A1 | 4/2009 |
| EP | 008061 A2 | 9/1983 |
| EP | 1296595 B1 | 8/2007 |
| EP | 2402279 A1 | 1/2012 |
| JP | S-50-20727 | 7/1975 |
| JP | H02-131435 U | 11/1990 |
| JP | 2000-237250 A | 9/2000 |
| WO | WO 2009/104096 A2 | 8/2009 |
| WO | WO 2013/117750 | 8/2013 |
| WO | WO 2017/083666 | 5/2017 |

OTHER PUBLICATIONS

Extended European Search Report for European Application No. 16747097.0, dated Jul. 27, 2018, 8 pages.
Final Notice of Reasons for Rejection for Japanese Application No. 2017-052240, dated Jul. 19, 2018, 4 pages.
International Search Report and Written Opinion for International Application No. PCT/US2014/012064, dated May 9, 2014.
International Search Report and Written Opinion for International Application No. PCT/US2016/016131, dated Apr. 21, 2016, 10 pages.
International Search Report and Written Opinion for International Application No. PCT/US2016/061552, dated Jan. 31, 2017, 10 pages.
International Search Report and Written Opinion for International Application No. PCT/US2017/050482, dated Dec. 21, 2017, 9 pages.
International Search Report and Written Opinion for International Application No. PCT/US2018/018166, dated Jul. 2, 2018, 11 pages.
Notice of Reasons for Rejection for Japanese Application No. 2015-553851, dated Jul. 4, 2016, 5 pages.
Notice of Reasons for Rejection for Japanese Application No. 2017-052240, dated Jan. 15, 2018, 9 pages.
Office Action for U.S. Appl. No. 13/745,830, dated Dec. 17, 2015, 9 pages.
Office Action for U.S. Appl. No. 13/745,830, dated Jun. 15, 2015, 9 pages.

(56) References Cited

OTHER PUBLICATIONS

Office Action for U.S. Appl. No. 13/745,830, dated Jun. 2, 2016, 11 pages.
Office Action for U.S. Appl. No. 14/226,021, dated Feb. 22, 2017, 11 pages.
Office Action for U.S. Appl. No. 14/226,021, dated Sep. 14, 2016, 13 pages.
Office Action for U.S. Appl. No. 14/613,140, dated Aug. 28, 2017, 25 pages.
Office Action for U.S. Appl. No. 14/613,140, dated Mar. 26, 2018, 28 pages.
Office Action for U.S. Appl. No. 14/613,140, dated Oct. 30, 2018, 28 pages.
Office Action for U.S. Appl. No. 15/783,755, dated May 7, 2018, 13 pages.
VAHLE Electrification Systems, "Enclosed Conductor System KBH," Catalogue, 2014, 28 pages.
Vallery, H. et al., "Multidirectional Transparent Support for Overground Gait Training," 2013 IEEE International Conference on Rehabilitation Robotics, Seattle, WA (Jun. 2013), 7 pages.
European Examination Report for European Application No. 14740676.3, dated Jun. 14, 2019, 5 pages.
Extended European Search Report for European Application No. 16865093.5, dated Apr. 2, 2019, 6 pages.

* cited by examiner

10

Move a trolley from a first position, in which the trolley is movably suspended from a first support track portion and is in electrical contact with a first power rail portion, to a second position, in which the trolley is movably suspended from a support track portion of a switch and is in electrical contact with a power rail portion of the switch.
11

Transition a switch from a first configuration to a second configuration.
12

Move the trolley from the second position to a third position such that the trolley is movably suspended from a second support track portion and is in electrical contact with the second power rail portion.
13

FIG. 12

APPARATUS AND METHODS FOR SUPPORT TRACK AND POWER RAIL SWITCHING IN A BODY WEIGHT SUPPORT SYSTEM

CROSS-REFERENCE TO RELATED APPLICATIONS

This application claims priority to and the benefit of U.S. Provisional Patent Application Ser. No. 62/254,088 entitled, "Apparatus and Methods for Support Track and Power Rail Switching in a Body Weight Support System," filed Nov. 11, 2015, the disclosure of which is incorporated herein by reference in its entirety.

BACKGROUND

The embodiments described herein relate to apparatus and methods for supporting the body weight of a patient. More particularly, the embodiments described herein relate to apparatus and methods for support track and power rail switching while supporting a trolley of a body weight support system.

Successfully delivering intensive yet safe gait therapy to individuals with significant walking deficits can present challenges to skilled therapists. In the acute stages of many neurological injuries such as stroke, spinal cord injury, traumatic brain injury, or the like individuals often exhibit highly unstable walking patterns and poor endurance, making it difficult to safely practice gait for both the patient and therapist. Because of this, rehabilitation centers often move over-ground gait training to a treadmill where body-weight support systems can help minimize falls while raising the intensity of the training.

In some instances, body-weight supported treadmill training can promote gains in walking ability similar to or greater than conventional gait training. Unfortunately, there are few systems for transitioning patients from training on a treadmill to safe, weight-supported over-ground gait training. Furthermore, since a primary goal of most individuals with walking impairments is to walk in their homes and in their communities rather than on a treadmill, it is often desirable that therapeutic interventions targeting gait involve over-ground gait training (e.g., not on a treadmill). Some known over-ground gait support systems include a motorized trolley and rail system. The trolley in such systems is programmed to move along a rail system while following the subject's movement (e.g., supporting at least a portion of the subject's weight). In some such systems, the rail system is a closed loop or otherwise a single path along which the trolley moves. As such, some know rail systems do not allow for changing or switching of the rail system to allow the trolley to move along more than one predefined path, which can limit the therapeutic options during gait training. Moreover, such rail systems may lack a section of the rail system where one or more trolleys can be stored while not inhibiting or blocking a trolley moving along the rail system.

Thus, a need exists for improved apparatus and methods for support track and power rail switching while supporting a trolley of a body weight support system.

SUMMARY

Apparatus and methods for support track and power rail switching while supporting a trolley of a body weight support system are described herein. In some embodiments, a body weight support system includes a support track configured to movably suspend a trolley therefrom. The trolley is configured to support at least a portion of a body weight of a patient. A power rail is coupled to the support track and is in electrical contact with the trolley. A switch included in the system has a support track portion and a power rail portion. The switch is configured to transition between a first configuration, in which a first portion of the support track and the support track portion of the switch define a first path, and a second configuration, in which a second portion of the support track and the support track portion of the switch define a second path. The trolley is configured to receive a flow of electric power from at least one of the power rail or the power rail portion of the switch that is operable to move the trolley along the first path when the switch is in the first configuration and along the second path when the switch is in the second configuration.

BRIEF DESCRIPTION OF THE DRAWINGS

FIG. 12 is a flowchart illustrating a method of using a body weight support system according to an embodiment.

DETAILED DESCRIPTION

Figure 1:
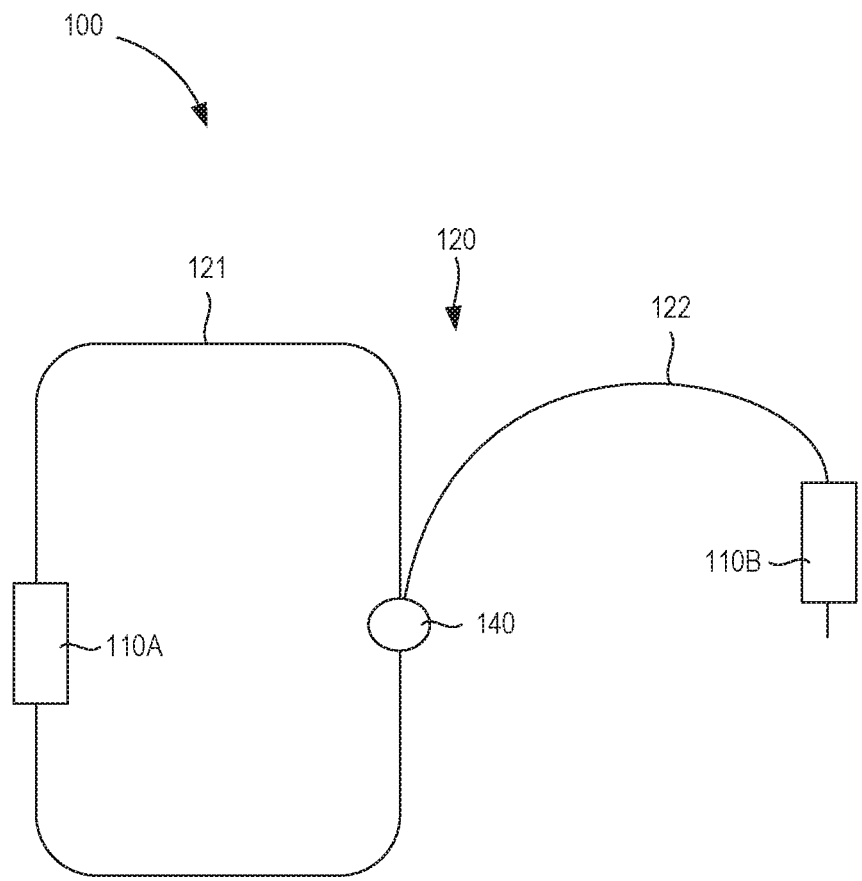
FIG. 1 is a schematic illustration of a portion of a body weight support system according to an embodiment.

In some embodiments, a body weight support system includes a support track configured to movably suspend a trolley therefrom. The trolley is configured to support at least a portion of a body weight of a patient. A power rail is coupled to the support track and is in electrical contact with the trolley. A switch included in the system has a support track portion and a power rail portion. The switch is configured to transition between a first configuration, in which a first portion of the support track and the support track portion of the switch define a first path, and a second configuration, in which a second portion of the support track and the support track portion of the switch define a second path. The trolley is configured to receive a flow of electric power from at least one of the power rail or the power rail portion of the switch that is operable to move the trolley along the first path when the switch is in the first configuration and along the second path when the switch is in the second configuration.

In some embodiments, a body weight support system includes a support track, a power rail, a switch, and a trolley. The support track has a first track portion and a second track portion discontinuous from the first track portion. The power rail has a first power rail portion and a second power rail portion discontinuous from the first power rail portion. The first power rail portion is coupled to the first track portion and the second power rail portion is coupled to the second track portion. The switch has a support track portion and a power rail portion. The switch is configured to transition between a first configuration, in which the support track portion of the switch is aligned with the first track portion and the power rail portion of the switch is aligned with the first power rail portion, and a second configuration, in which the support track portion of the switch is aligned with the second track portion and the power rail portion of the switch is aligned with the second power rail portion. The trolley is configured to support at least a portion of a body weight of a patient. The trolley is configured to be moved from a first position to a second position while the switch is in the first configuration. The trolley is movably suspended from the first track portion and in electrical contact with the first power rail portion when in the first position and the trolley is movably suspended from the support track portion of the switch and in electrical contact with the power rail portion of the switch when in the second position. The trolley is configured to be moved from the second position to a third position after the switch is transitioned from the first configuration to the second configuration. The trolley is movably suspended from the second track portion and in electrical contact with the second power rail portion when in the third position.

In some embodiments, a method includes moving, from a first position to a second position, a trolley configured to support at least a portion of a body weight of a patient. The trolley is movably suspended from a first support track portion and is in electrical contact with a first power rail portion when in the first position and is movably suspended from a support track portion of a switch and is in electrical contact with a power rail portion of the switch when in the second position. The switch is transitioned from a first configuration, in which the support track portion and the power rail portion of the switch are aligned with the first support track portion and the first power rail portion, respectively, to a second configuration, in which the support track portion of the switch is aligned with a second support track portion discontinuous from the first support track portion and the power rail portion of the switch is aligned with a second power rail portion discontinuous from the first power rail portion. The trolley is moved from the second position to a third position, in which the trolley is movably suspended from the second support track portion and is in electrical contact with the second power rail portion.

In some embodiments, a rail system includes a support track, a power rail, and a switch. The support track is configured to support a trolley of a body weight support system. The power rail is configured to be in electrical communication with the trolley to provide a flow of electric current to a portion of the trolley. The switch includes a support track portion and a power rail portion. The switch is configured to transition between a first configuration in which the support track and the support track portion of the switch define a first path and a second configuration in which the support track and the support track portion of the switch define a second path, different from the first path. At least one of the power rail and the power rail portion of the switch configured to provide a substantially uninterrupted flow of electric current to the portion of the trolley as the trolley moves along the support track.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the term "parallel" generally describes a relationship between two geometric constructions (e.g., two lines, two planes, a line and a plane or the like) in which the two geometric constructions are substantially non-intersecting as they extend substantially to infinity. For example, as used herein, a line is said to be parallel to another line when the lines do not intersect as they extend to infinity. Similarly, when a planar surface (i.e., a two-dimensional surface) is said to be parallel to a line, every point along the line is spaced apart from the nearest portion of the surface by a substantially equal distance. Two geometric constructions are described herein as being "parallel" or "substantially parallel" to each other when they are nominally parallel to each other, such as for example, when they are parallel to each other within a tolerance. Such tolerances can include, for example, manufacturing tolerances, measurement tolerances or the like.

FIG. 1 is a schematic illustration of at least a portion of a body weight support system 100 according to an embodiment. The body weight support system 100 (also referred to herein as "support system") includes at least a trolley 110A, a support track 120, and a switch 140. The support system 100 can be used, for example, in gait therapy to support patients with walking deficiencies brought on by neurological injuries such as stroke, spinal cord injury, traumatic brain injury, or the like. In such instances, the support system 100 can be used to support at least a portion of the patient's body weight to facilitate the gait therapy. In other instances, the support system 100 can be used to simulate, for example, low gravity scenarios for the training of astronauts or the like. In some embodiments, a portion of the support system 100 can be used to support a patient over a treadmill or stairs instead of or in addition to supporting a patient over and across level ground.

As described above, the support system 100 includes at least one trolley 110A. More particularly, the support system 100 shown in FIG. 1 includes the trolley 110A (e.g., a first trolley) and a second trolley 110B. In this embodiment, the trolleys 110A and 110B are substantially similar; thus, a discussion of the first trolley 110A applies equally to the second trolley 110B. The trolley 110A included in the support system 1000 can be any suitable shape, size, or configuration and can include one or more systems, mechanisms, assemblies, or subassemblies (not shown) that can perform any suitable function associated with, for example, supporting at least a portion of the body weight of a patient. For example, in some embodiments, the trolley 110A can include at least a drive system, a support mechanism, and an electronic system. In some embodiments, the drive system can be movably coupled to the support track 120 and configured to move (e.g., slide, roll, or otherwise advance) along a length of the support track 120. The support mechanism can be temporarily coupled to a harness or attachment device worn by or coupled to the patient (e.g., via a tether or other support device) to support a portion of the body weight of a patient and temporarily couple the patient to the trolley 110A.

The electronic system of the trolley 110A can control at least a portion of thereof. For example, the trolley 110A can include one or more motors configured to power (e.g., drive, rotate, spin, engage, activate, etc.) the drive system and/or the support mechanism (e.g., to allow the support mechanism to dynamically support at least a portion of a patient's weight). For example, the electronic system can include at least a processor (e.g., a general-purpose processor (GPU), a central processing unit (CPU), an accelerated processing unit (APU), an application specific integrated circuit (ASIC), and/or the like) and a memory (e.g., a random access memory (RAM), a memory buffer, a hard drive, a read-only memory (ROM), an erasable programmable read-only memory (EPROM), and/or the like). As such, the memory stores instructions to cause the processor to execute modules, processes, and/or functions associated with controlling one or more mechanical and/or electrical systems included in the trolley 110A (e.g., the motors, sensors, control devices, etc.). In some embodiments, control signals are delivered through a power rail (not shown) using, for example, a broadband over power-line (BOP) configuration. In some embodiments, the trolley 110A and/or 110B can be substantially similar to the those described in U.S. Patent Publication No. 2015/0143627 (the "'627 publication") entitled, "Methods and Apparatus for Body Weight Support System," filed Feb. 3, 2015, the disclosure of which is incorporated herein by reference in its entirety.

The support track 120 can be any suitable shape, size, or configuration. For example, in some embodiments, the support track 120 can be substantially linear or curvilinear. In some embodiments, the support track can be a beam (e.g., an I-beam or the like) included in a roof or ceiling structure from which at least a portion of the trolley 110A can "hang" (e.g., at least a portion of the trolley 110A can extend away from the beam). In other embodiments, at least one end portion of the support track can be coupled to a vertical wall or the like. In still other embodiments, the support track can be included in a freestanding structure such as, for example, a gantry or an A-frame. In some embodiments, the support track 120 can be a closed loop such as, for example, circular, oval, oblong, rectangular (e.g., with or without rounded corners), or any other suitable shape. As shown in FIG. 1, for example, the support track 120 includes a first portion 121 and a second portion 122. In this embodiment, the first portion 121 is a substantially closed loop portion of the support track 120 while the second portion 122 is not a closed loop portion of the support track 120.

The first portion 121 of the support track 120 and the second portion 122 of the support track 120 are selectively coupled via a switch 140. The switch 140 can be any suitable switch or the like. For example, although not shown in FIG. 1, the switch 140 can include a support track portion that collectively forms the support track 120 with at least one of the first portion 121 or the second portion 122. In some embodiments, the switch 140 can be an electromechanical device or mechanism configured to move relative to the support track 120 to transition the support track 120 between a first configuration and a second configuration. Specifically, the switch 140 can be placed in a first position and/or orientation to place the support track 120 in the first configuration. In first configuration, the support track portion of the switch 140 aligned with and/or can otherwise form a section of the first portion 121 of the support track 120. In such instances, for example, the support track portion of the switch 140 and the first portion 121 of the support track 120 can collectively define a closed loop in which the second portion 122 is at least partially isolated from the first portion 121 and/or the support portion of the switch 140. Conversely, the switch 140 can be moved to a second position and/or orientation to place the support track 120 in the second configuration. In the second configuration, the support track portion of the switch 140, the first portion 121 of the support track 120, and the second portion 122 of the support track can collectively define an open path in which the support track portion of the switch 140 at least operatively connects the first portion 121 of the support track 120 to the second portion 122 of the support track 120.

The switch 140 can be moved relative to the support track 120 in any suitable manner. For example, in some embodiments, the support system 100 can include a motor or device configured to move the switch 140 in a linear direction relative to the support track 120. In other embodiments, the motor or device can be configured to rotate 140 the switch relative to the support track 120 (e.g., the switch 140 can be a turntable or the like). In some embodiments, a user can control the switch 140 via a remote control operatively coupled thereto. For example, in some embodiments, the user can control the switch via a computer application run on a personal computer and/or laptop, a mobile application run on a mobile device such as a smartphone or tablet, a hand-held remote, and/or any other suitable remote control interface.

Although not shown in FIG. 1, the support system 100 can also include a power rail configured to provide electric power to one or more trolleys and/or to the switch 140. In some embodiments, the power rail can be disposed adjacent to the support track 120 and can follow a substantially parallel path. Moreover, the switch 140 can include a power rail portion configured to electrically connect to at least one of the first portion 121 and/or the second portion 122 of the support track 120 when the support track 120 is in the first configuration and/or the second configuration. In other words, the power rail portion of the switch 140 can function substantially similarly to the support track portion. In this manner, the user can control the support system 100 to place the support track 120 and/or the switch 140 in the first configuration or the second configuration. Accordingly, when the switch 140 places the support track 120 in the first configuration, the first trolley 110A and/or the second trolley 110B can be configured to move along the substantially closed loop formed by the first portion 121 and the support track portion of the switch 140. Conversely, when the switch 140 places the support track 120 in the second configuration, the first trolley 110A and/or the second trolley 110B can be configured to move along the first portion 121 and/or the second portion 122 of the support track 120.

By way of example, in some instances, it may be desirable to use the first trolley 110A to support a portion of a patient's weight during gait therapy and/or otherwise desirable to move the first trolley 110A along the support track 120, while the second trolley 110B is maintained in an unused, unpowered, and/or "powered off" configuration. In such instances, the user can, for example, move the switch 140 (e.g., via a controller) to place the support track 120 in the second configuration to allow the second trolley 110B to be moved onto and/or along the second portion 122 of the support track 120. Once the second trolley 110B is supported by the second portion 122 of the support track 120, the user can move the switch 140 to place the support track 120 in the first configuration such that the first portion 121 of the support track 120 forms a substantially closed loop. Thus, the first trolley 110A can be moved along the first portion 121 of the support track 120 while the second trolley 110B is supported by the second portion 122.

While the switch 140 is shown and described above with reference to FIG. 1 as switching between the first portion 121 and the second portion 122 of the support track, in other embodiments, the switch 140 can be configured to switch between any suitable number of portions of the support track 120. Moreover, while the support system 100 is shown as including a single switch, in other embodiment, the support system 100 can include any suitable number of switches operated at different locations along the support track 120.

Figure 2:
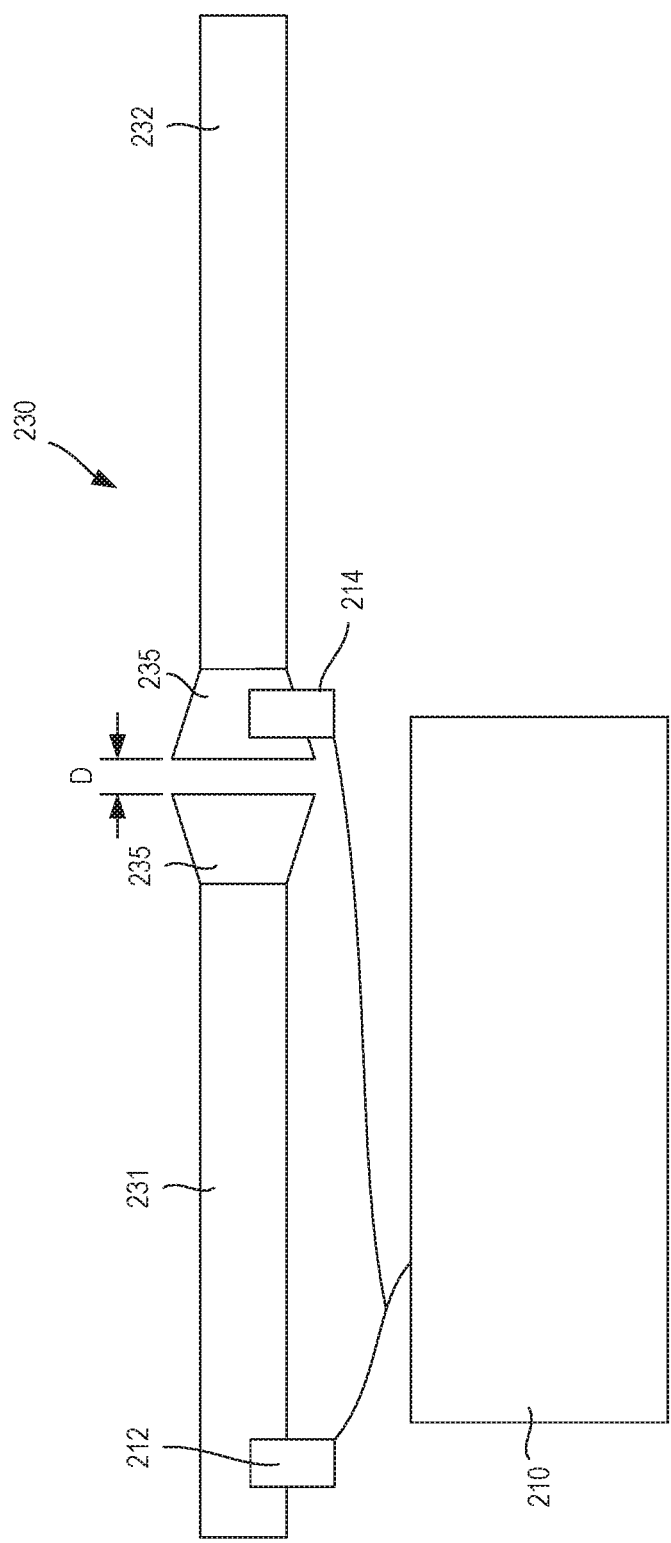
FIG. 2 is a schematic illustration of a portion of a power rail and a trolley included in a body weight support system according to another embodiment.

FIG. 2 is a schematic illustration of a trolley 210 and a power rail 230 included in a support system according to another embodiment. The power rail 230 includes a first portion 231 and a second portion 232. The first portion 231 and the second portion 232 each include a flared end portion 235. As shown, the first portion 231 and the second portion 232 are separated by a distance D. For example, in some embodiments, the second portion 232 of the power rail 230 can be disposed on a switch or the like (not shown in FIG. 2) configured to transition the power rail 230 between a first configuration and a second configuration, as described above with reference to the support track 220. In some embodiments, the distance D is configured to allow for movement of the second portion 232 of the power rail 230 relative to the first portion 231 (e.g., in response to a movement of the switch).

The trolley 210 can be, for example, substantially similar to the trolley 110A described above with reference to FIG. 1. In the embodiment shown in FIG. 2, the trolley 210 includes a first electrical collector 212 and a second electrical collector 214. The electrical collectors 212 and 214 are each in electrical contact with the power rail 230. More specifically, the first electrical collector 212 is in electrical contact with the first portion 231 of the power rail 230 and the second electrical collector 214 is in electrical contact with the second portion 232 of the power rail 230. In this embodiments, the arrangement of the first electrical collector 212 and the second electrical collector 214 is such that the trolley 210 can remain in electrical connection with the power rail 230 as the second collector 214 or the first collector 212 is moved between the first portion 231 of the power rail 230 and the second portion 232 of the power rail 230. Moreover, the flanged end portion 235 can be configured to facilitate the movement of the electrical collectors between the first portion 231 and the second portion 232.

In other embodiments, a trolley can use a single electrical collector. In such embodiments, the trolley can have an internal power source (such as back-up battery) to enable the trolley to move across the distance D between the first portion 231 and the second portion 232 of the power rail 230.

Figure 3:
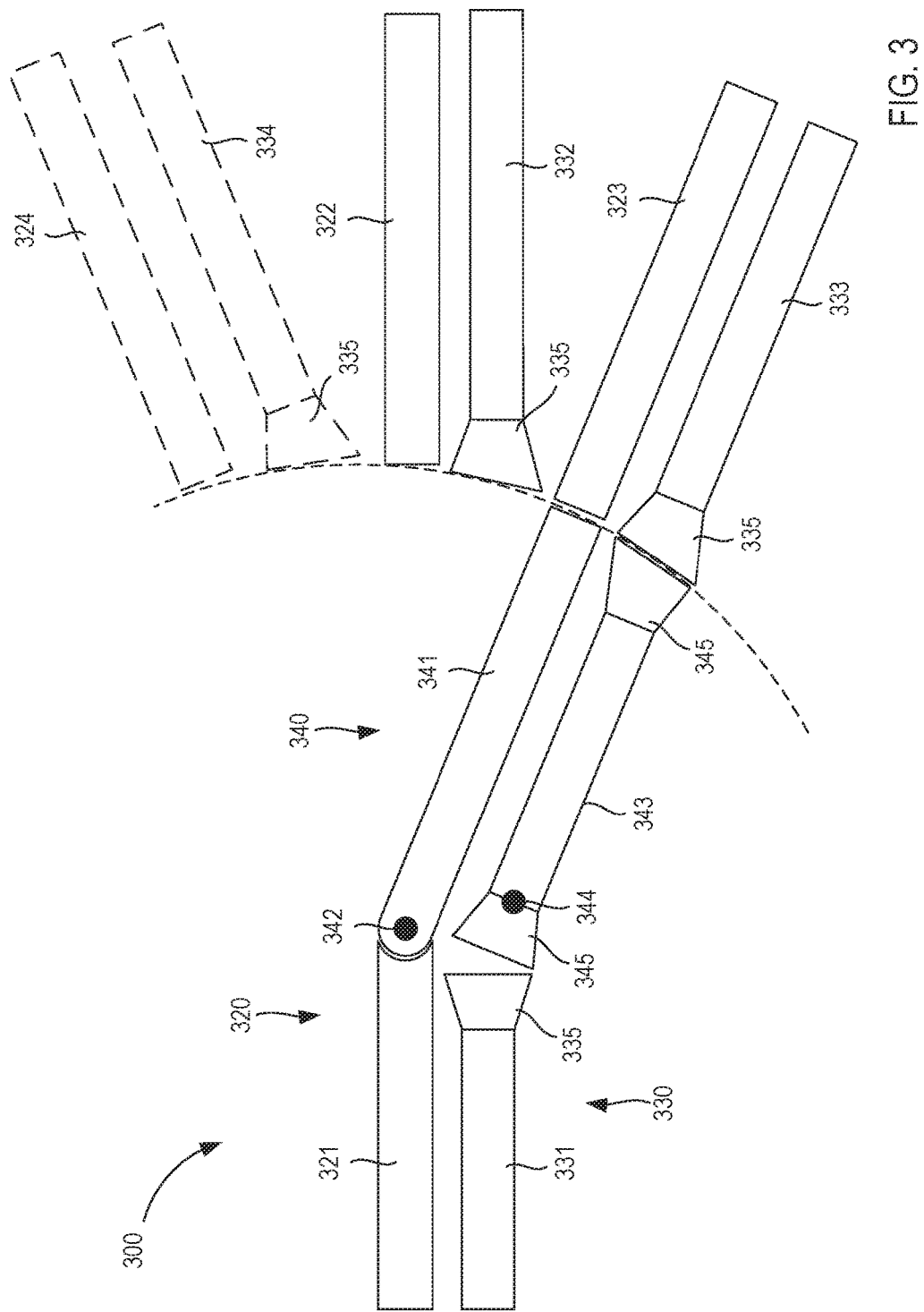
FIG. 3 is a schematic illustration of a portion of a body weight support system according to another embodiment.

FIG. 3 is a schematic illustration of a portion of a support system 300 according to another embodiment. In some embodiments, the portion of the support system 300 can be substantially similar, at least in part, to the support system 100 described above with reference to FIG. 1. For example, the portion of the support system 300 includes a support track 320, a power rail 330, and a switch 340. Although not shown in FIG. 3, in some embodiments, the support track 320 can be configured to support a trolley or the like included in the support system 300. Similarly, the power rail 330 can be configured to provide a flow of electrical current to a portion of the trolley (not shown in FIG. 3). Thus, the portion of the support system 300 can be used to, for example, support a trolley, which in turn, can support at least a portion of a patient's weight during gait therapy and/or the like.

As shown in FIG. 3, the support track 320 includes a first portion 321, a second portion 322, and a third portion 323. The power rail 330 includes a first portion 331 having at least one flared end 335, a second portion 332 having at least one flared end 335, and a third portion 333 having at least one flared end 335. The switch 340 includes a support track portion 341 having an axle 342 and a power rail portion 343 having an axle 344. Moreover, each end of the power rail portion 343 includes and/or forms a flare 345. As described above with reference to FIG. 2, the flared ends 335 of the first portion 331 and second portion 332 of the power rail 330 and the flared ends 345 of the power rail portion 343 of the switch 340 can facilitate a movement of one or more electrical collectors of the trolley between the first portion 331 and/or second portion 332 of the power rail 330 and the power rail portion 343 of the switch 340.

As described above with reference to the support system 100 of FIG. 1, the switch 340 is configured to be moved relative to the support track 320 and the power rail 330 to transition the portion of the support system 300 between a first configuration and a second configuration. For example, as described above with reference to the support system 100, a user can manipulate a control device such as a personal computer, laptop, tablet, smartphone, and/or any other remote control device to send a control signal to the switch 340. In response to the control signal, the switch 340 can be moved (e.g., via an electromechanical device such as a motor) relative to the support track 320 and the power rail 330 between a first position and/or orientation and a second position and/or orientation. More specifically, in this embodiment, the control signal can result in the support track portion 341 being rotated about its axle 342 and the power rail portion 343 being rotated about its axle 344.

For example, as shown in FIG. 3, the switch 340 can be placed in a first position and/or orientation (e.g., in response to receiving a control signal) such that the support track portion 341 of the switch 340 operatively couples the first portion 321 of the support track 320 to the third portion 323 of the support track 320 and the power rail portion 343 operatively couples the first portion 331 of the power rail 330 to the third portion 333 of the power rail 330. Thus, a trolley (not shown in FIG. 3) can be moved along the first portion 321 of the support track 320 and the support track portion 341 of the switch 340 to the third portion 323 of the support track 320. Similarly, one or more electrical collectors of the trolley can be moved along the first portion 331 of the power rail 330 and the power rail portion 343 of the switch 340 to the third portion 333 of the power rail 330. In other instances, the switch 340 can be placed in a second position and/or orientation (not shown in FIG. 3) such that the trolley can be moved along the first portion 321 of the support track 320 and the support track portion 341 of the switch 340 to the second portion 322 of the support track 320 while the one or more electrical collectors is moved along the first portion 331 of the power rail 330 and the power rail portion 343 of the switch 340 to the second portion 332 of the power rail 330.

In some embodiments, the power rail 330 can be located on the other side of the support track 320, as compared to the relative position described above with reference to FIG. 3. While the switch 340 is described above as being moved between a first position and a second position, in some embodiments, the switch 340 can be moved, for example, to a third position. For example, as shown in FIG. 3, the support track 320 and the power rail 330 can each include a fourth portion 324 and 334, respectively. In this manner, the switch 340 can be configured to transition the support system between a first configuration corresponding to a first path along which the trolley can move, a second configuration corresponding to a second path along which the trolley can move, and a third configuration corresponding to a third path along which the trolley can move. While support track 320 and the power rail 330 are shown and described as including the optional fourth portions 324 and 334, respectively, in still other embodiment, the support track 320 and the power rail 330 can include any suitable number of portions and thus, any suitable number of paths along which one or more trolleys can move.

Figure 4:
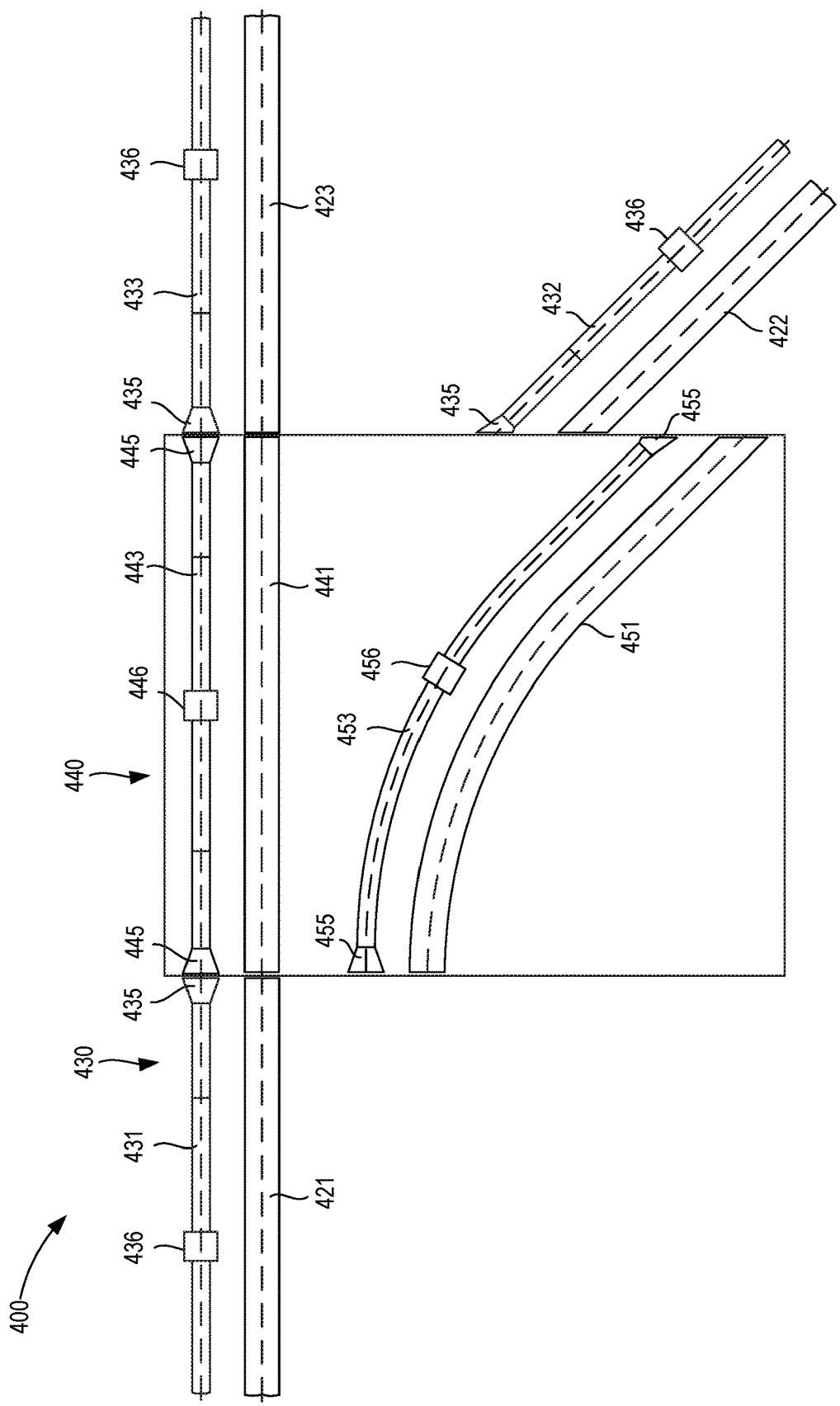
FIGS. 4 and 5 are schematic illustrations of a portion of a body weight support system in a first configuration and a second configuration, respectively, according to another embodiment.

While the switch 340 is shown and described above with reference to FIG. 3 as being rotated or pivoted relative to the support track 320 and the power rail 330, in other embodiments, a switch can be moved in a linear motion relative to a support track and/or power rail. For example, FIG. 4 is a schematic illustration of a portion of a support system 400 according to another embodiment. In some embodiments, the portion of the support system 400 can be substantially similar, at least in part, to the support system 100 described above with reference to FIG. 1. For example, the portion of the support system 400 includes a support track 420, a power rail 430, and a switch 440. Although not shown in FIG. 4, in some embodiments, the support track 420 can be configured to support a trolley or the like included in the support system 400. Similarly, the power rail 430 can be configured to provide a flow of electrical current to a portion of the trolley (not shown in FIG. 4). Thus, the portion of the support system 400 can be used to, for example, support a trolley, which in turn, can support at least a portion of a patient's weight during gait therapy and/or the like.

Figure 5:
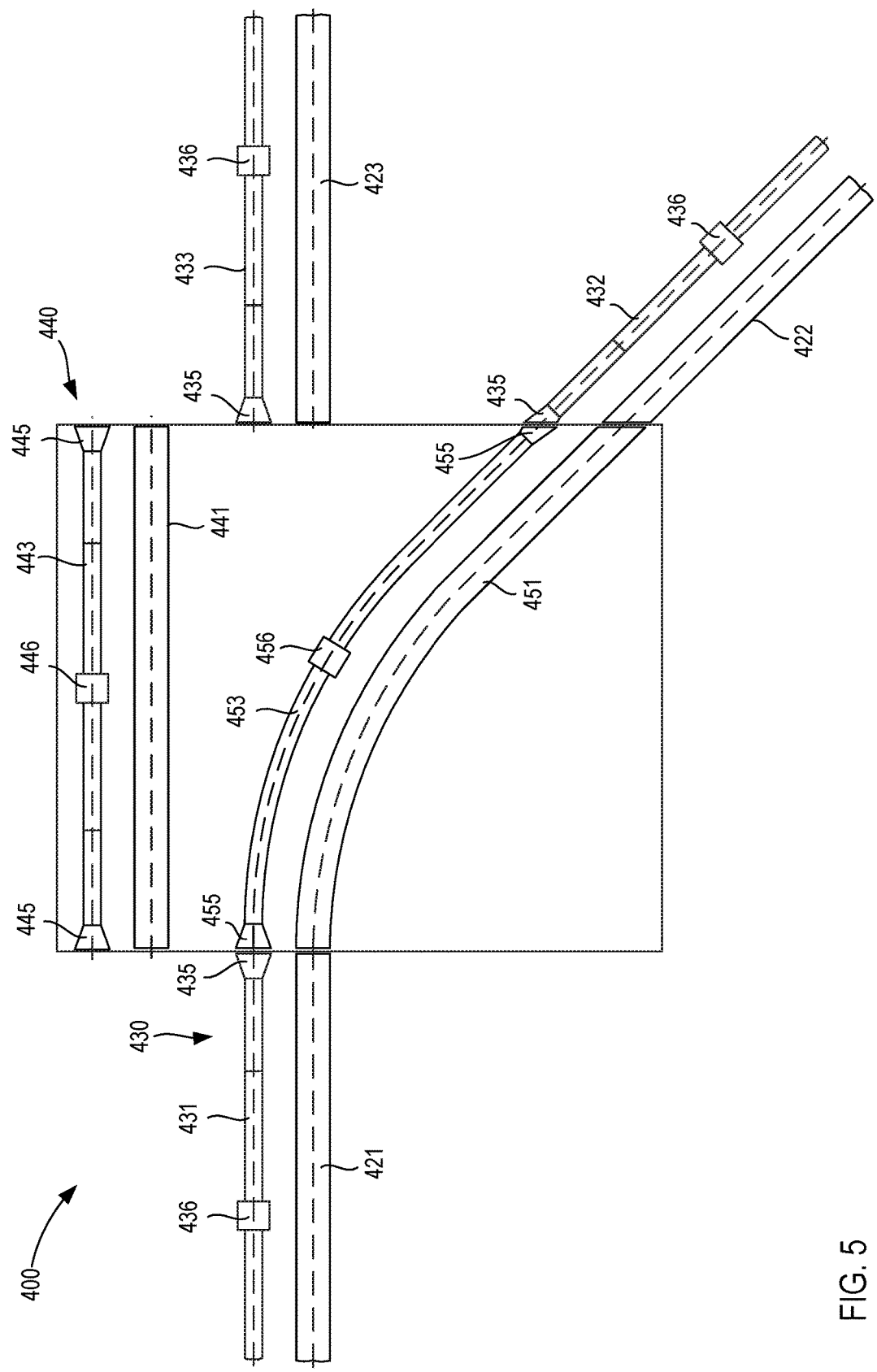

As shown in FIGS. 4 and 5, the support track 420 includes a first portion 421, a second portion 422, and a third portion 423. The power rail 430 includes a first portion 431 having at least one flared end 435, a second portion 432 having at least one flared end 435, and a third portion 433 having at least one flared end 435. The switch 440 includes a first support track portion 441 and a second support track portion 451, and a first power rail portion 443 and a second power rail portion 453. The switch 440 may also contain a mounting frame and/or plate (not shown) that supports all elements of the switch 440 and enables them to move together when performing the switching action. Each end of the power rail portions 443 and 453 includes and/or forms a flare 445 and 455, respectively. As described above with reference to FIG. 2, the flared ends 435 of the first portion 431, second portion 432, and third portion 433 of the power rail 430 and the flared ends 445 and 455 of the power rail portions 443 and 453, respectively, of the switch 440 can facilitate a movement of one or more electrical collectors of the trolley between the first portion 431, second portion 432, and/or third portion 433 of the power rail 430 and the power rail portions 443 and 453 of the switch 440. Moreover, as shown in FIGS. 4 and 5, each portion 431, 432, and 433, of the power rail 430 includes an electrical line feed 436. That is to say, each portion 431, 432, and 433 of the power rail 430 can be independently connected (i.e., electrically) to a power source (not shown in FIG. 5). Similarly, the power rail portions 443 and 453 of the switch 440 each includes an electrical line feed 446 and 456, respectively, configured to electrically connect the power rail portions 443 and 453, respectively, of the switch 440 to the power source.

As described above with reference to the support system 100 of FIG. 1, the switch 440 is configured to be moved relative to the support track 420 and the power rail 430 to transition the portion of the support system 400 between a first configuration and a second configuration. For example, as described above with reference to the support system 100, a user can manipulate a control device such as a personal computer, laptop, tablet, smartphone, and/or any other remote control device to send a control signal to the switch 440. In response to the control signal, the switch 440 can be moved (e.g., via an electromechanical device such as a motor) relative to the support track 420 and the power rail 430 between a first linear position (FIG. 4) and a second linear position (FIG. 5). More specifically, in this embodiment, the control signal can result in the support track portion 441 being translated in a linear motion relative to the support track 420 and the power rail 430.

For example, as shown in FIG. 4, the switch 440 can be placed in a first position (e.g., in response to receiving a control signal) such that the first support track portion 441 of the switch 440 operatively couples the first portion 421 of the support track 420 to the third portion 423 of the support track 420 and the first power rail portion 443 operatively couples the first portion 431 of the power rail 430 to the third portion 433 of the power rail 430. Thus, a trolley (not shown in FIGS. 4 and 5) can be moved along the first portion 421 of the support track 420 and the first support track portion 441 of the switch 440 to the third portion 423 of the support track 420. Similarly, one or more electrical collectors of the trolley can be moved along the first portion 431 of the power rail 430 and the first power rail portion 443 of the switch 440 to the third portion 433 of the power rail 430. In other instances, the switch 440 can be moved in a translational motion and placed in a second linear position, as shown in FIG. 5. With the switch 440 in the second linear position, the trolley can be moved along the first portion 421 of the support track 420 and the second support track portion 451 of the switch 440 to the second portion 422 of the support track 420 while the one or more electrical collectors is moved along the first portion 431 of the power rail 430 and the second power rail portion 453 of the switch 440 to the second portion 432 of the power rail 430.

While the switch 440 is described above as being moved between a first position and a second position, in some embodiments, the switch 440 can be moved, for example, to a third position. For example, in some embodiment, the switch 440 can include a third support track portion and a third power rail portion (not shown in FIGS. 4 and 5) configured to operatively couple, for example, the first portion 421 of the support track 420 and the first portion 431 of the power rail 430 to a fourth portion of the support track 420 and the power rail 430, respectively (not shown). In this manner, the switch 440 can be placed in a third linear position to transition the support system 400 to, for example, a third configuration, as described above with reference to the support system 300 of FIG. 3.

Figure 6:
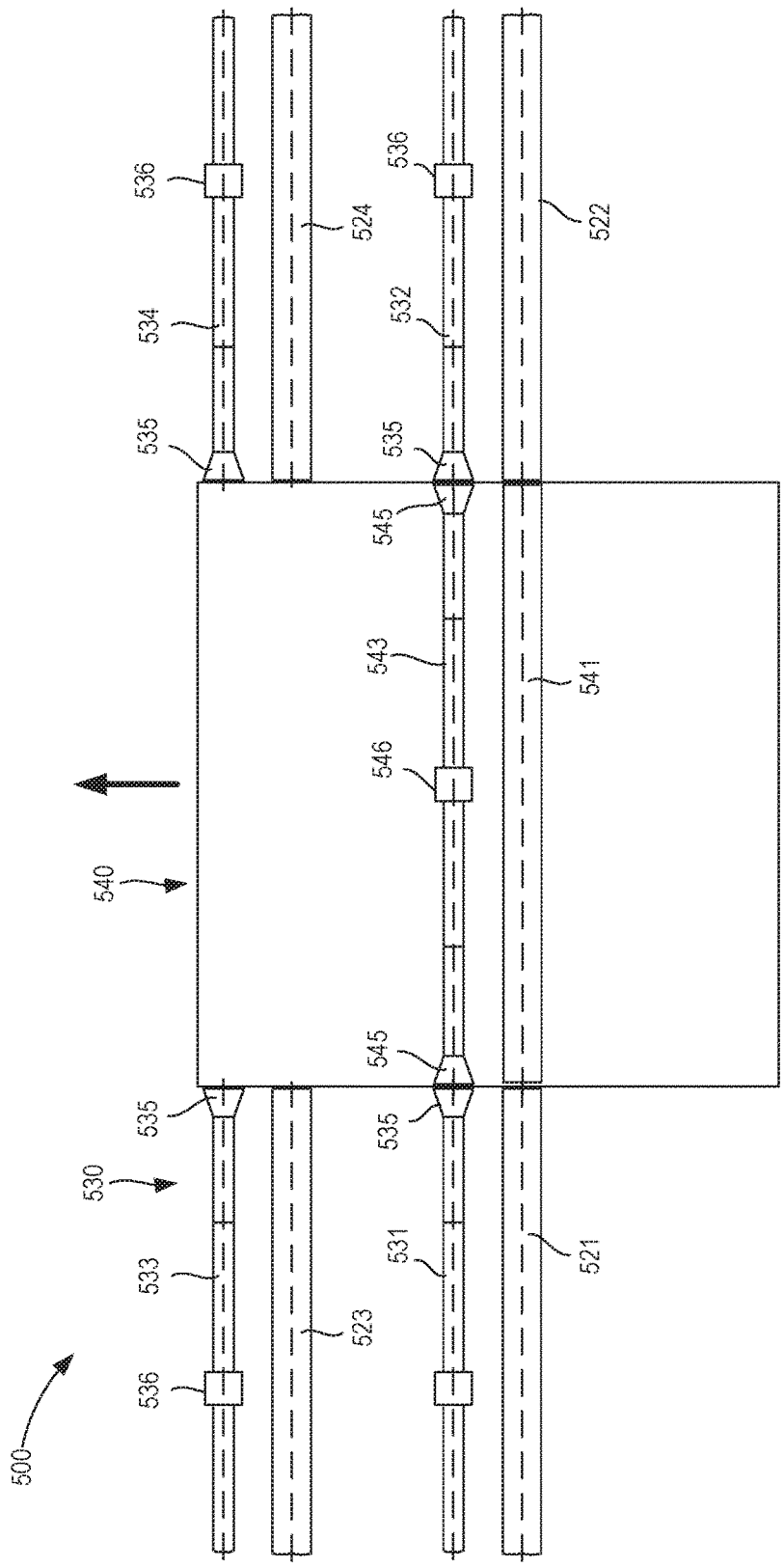
FIG. 6-11 are each schematic illustrations of a portion of a body weight support system according to various embodiments.

FIG. 6 is a schematic illustration of a portion of a support system 500 according to another embodiment. In some embodiments, the portion of the support system 500 can be substantially similar, at least in part, to the support systems described above (e.g., the support system 400 described above with reference to FIGS. 4 and 5). The portion of the support system 500 includes a support track 520, a power rail 530, and a switch 540. Although not shown in FIG. 6, in some embodiments, the support track 520 can be configured to support a trolley or the like included in the support system 500. Similarly, the power rail 530 can be configured to provide a flow of electrical current to a portion of the trolley (not shown in FIG. 6). Thus, the portion of the support system 500 can be used to, for example, support a trolley, which in turn, can support at least a portion of a patient's weight during gait therapy and/or the like. In some embodiments, the trolley can be similar to and/or substantially the same as the trolleys described in detail in the '627 publication incorporated by reference hereinabove.

In the embodiment shown in FIG. 6, the support track 520 includes a first portion 521, a second portion 522, a third portion 523, and a fourth portion 524. Likewise, the power rail 530 includes a first portion 531 having at least one flared end 535, a second portion 532 having at least one flared end 535, a third portion 533 having at least one flared end 535, and a fourth portion 534 having at least one flared end 535. The switch 540 includes a support track portion 541 and a power rail portion 543 forming a flare 545 at each end thereof. The switch 540 may also contain a mounting frame and/or plate (not shown) that supports all elements of the switch 540 and enables the elements to move together when performing one or more switching actions. As described above with reference to FIG. 2, the flared ends 535 of the power rail portions 531, 532, 533, and 534 and the flared ends 545 of the power rail portion 543 of the switch 540 can facilitate a movement of one or more electrical collectors of a trolley between the power rail portions 531, 532, 533, and/or 534 and the power rail portion 543 of the switch 540. As shown, each power rail portion 531, 532, 533, and 534 of the power rail 530 and the power rail portion 543 of the switch 540 includes and/or is electrically coupled to an electrical line feed 536. Thus, each power rail portion 531, 532, 533, 534, and/or 543 can be independently connected (i.e., electrically) to a power source (not shown in FIG. 6). As described above with reference to the trolley 210 illustrated in FIG. 2, in some embodiments, a trolley can include, for example, a first collector and a second collector. In this manner, as the trolley is advanced onto the switch, a first collector can remain in electrical contact with a power rail portion (e.g., the first portion 531) while the second collector can transition onto the power rail portion 543 of the switch 540. Thus, continuous electric power can be supplied to the trolley as the trolley moves onto the switch. In some instances, power can be withheld from the power rail portion 543 of the switch 540 as the trolley is being advanced onto the switch 540 (advanced along the support track 520 and power rail 530 such that the trolley is suspended from the switch 540). Moreover, electrical power can be withheld from the power rail portion 543 of the switch 540 while the trolley is suspended therefrom until the switch 540 is placed in a desired position relative to the support track 520 and power rail 530, which in turn, can ensure that the trolley is not advanced beyond the support track portion 541 of the switch 540 when the support track portion 541 of the switch 540 is unaligned with other portions of the support track 520.

As described above with reference to the support system 100 of FIG. 1, the switch 540 is configured to be moved relative to the support track 520 and the power rail 530 to transition the portion of the support system 500 between one or more configurations. For example, as described above with reference to the support system 100, a user can manipulate a control device such as a personal computer, laptop, tablet, smartphone, and/or any other remote control device to send a control signal to the switch 540. In response to the control signal, the switch 540 can be moved (e.g., via an electromechanical device such as a motor) relative to the support track 520 and the power rail 530 between a first linear position (e.g., a first configuration), in which the support track portion 541 and power rail portion 543 of the switch 540 are aligned with the first portion 521 and second portion 522 of the support track 520 and the first portion 531 and the second portion 532 of the power rail 530, respectively, and a second linear position (e.g., a second configuration), in which the support track portion 541 and power rail portion 543 of the switch 540 are aligned with the third portion 523 and fourth portion 524 of the support track 520 and the third portion 533 and the fourth portion 534 of the power rail 530, respectively.

The arrangement described above is such that a trolley (not shown in FIG. 6) can be moved along the first portion 521 of the support track 520 and the first support track portion 541 of the switch 540 to the second portion 522 of the support track 520. Similarly, one or more electrical collectors of the trolley can be moved along the first portion 531 of the power rail 530 and the first power rail portion 543 of the switch 540 to the second portion 532 of the power rail 530. In other instances, the switch 540 can be moved in a translational motion and placed in a second linear position such that the trolley can be moved along the third portion 523 of the support track 520 and the support track portion 541 of the switch 540 to the fourth portion 524 of the support track 520 while the one or more electrical collectors is moved along the third portion 533 of the power rail 530 and the power rail portion 543 of the switch 540 to the fourth portion 534 of the power rail 530. In still other instances, the switch 540 can be in the first linear position to allow the trolley to move along the first portion 521 or the second portion 522 of the support track 520 and the one or more collectors to move along the first portion 531 or second portion 532 of the power rail 530 and onto the support track portion 541 and power rail portion 543 of the switch 540, respectively. Once the trolley is suspended from the switch 540, the switch 540 can be moved to the second linear position to allow the trolley to move along the support track portion 541 of the switch 540 and onto the third portion 523 or fourth portion 524 of the support track 520 and the one or more collectors onto the third portion 533 or fourth portion 534 of the power rail 530. In other words, the switch 540 can be configured to transition between the first linear position and the second linear position to "switch" and/or operably couple any suitable portion of the support track and any suitable portion of the power rail to allow the trolley to be moved therebetween.

While the switch 540 is described above as being moved between a first position and a second position, in some embodiments, the switch 540 can be moved, for example, to a third position, fourth position, fifth position, etc. Similarly stated, a support system can include any suitable number of support track portions and power rail portions and can include a switch configured to move through any suitable number of positions to operably couple the portions of the support track and the portions of the power rail, respectively, in any suitable manner.

Figure 7:
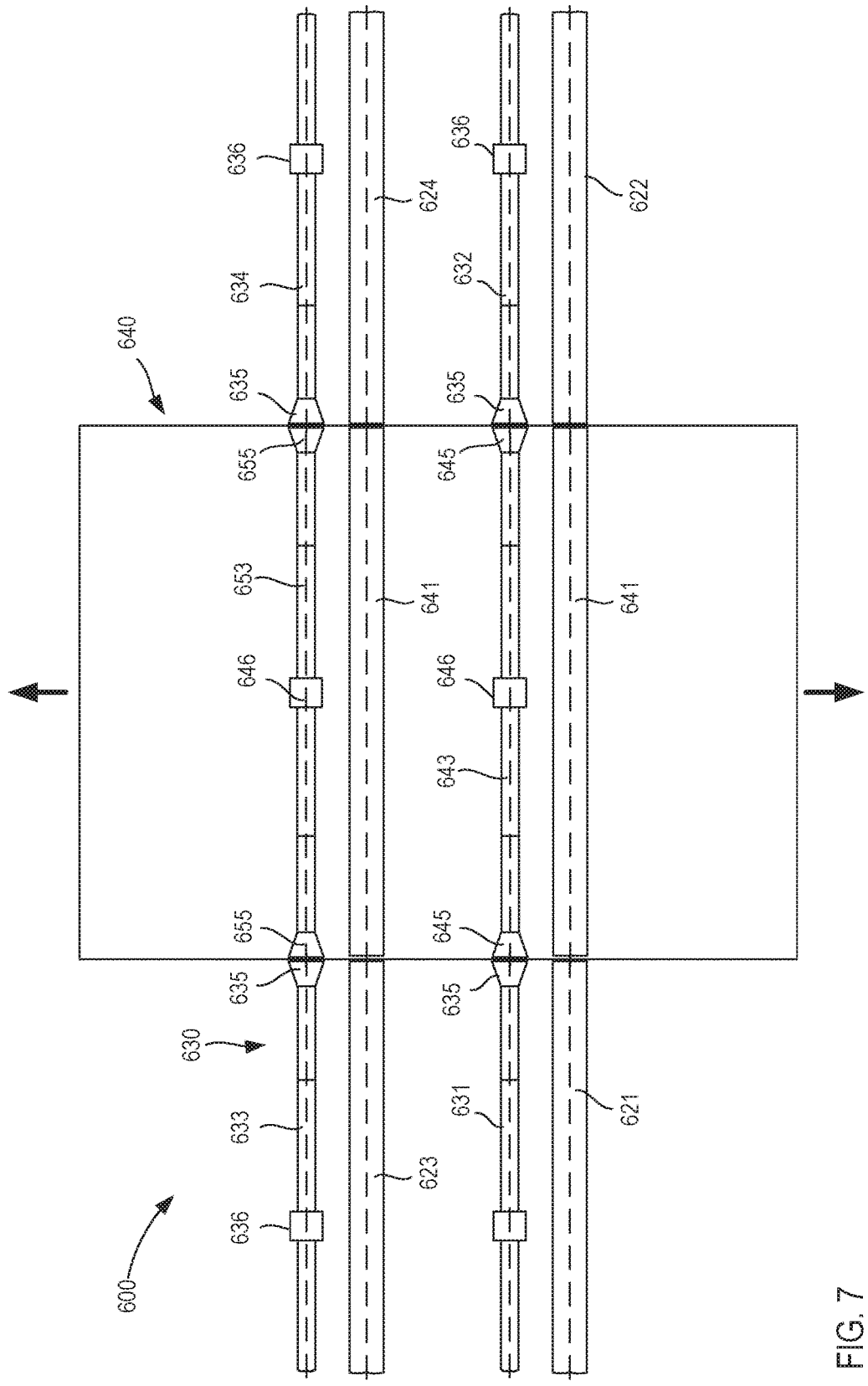

While the portion of a support system 500 described above with reference to FIG. 6 as having the switch 540 with one support track portion 541 and one power rail portion 543, in other embodiments, a switch can include any number of support track portions and power rail portions. For example, FIG. 7 is a schematic illustration of a portion of a support system 600 according to another embodiment. In some embodiments, the portion of the support system 600 can be substantially similar, at least in part, to the support systems described above (e.g., the portion of the support system 400 described above with reference to FIGS. 4 and 5 and/or the portion of the support system 500 described above with reference to FIG. 6).

The portion of the support system 600 includes a support track 620, a power rail 630, and a switch 640. Although not shown in FIG. 7, in some embodiments, the support track 620 can be configured to support a trolley or the like included in the support system 600. Similarly, the power rail 630 can be configured to provide a flow of electrical current to a portion of the trolley (not shown in FIG. 7). Thus, the portion of the support system 600 can be used to, for example, support a trolley, which in turn, can support at least a portion of a patient's weight during gait therapy and/or the like. In some embodiments, the trolley can be similar to and/or substantially the same as the trolleys described in detail in the '627 publication incorporated by reference hereinabove.

The support track 620 includes a first portion 621, a second portion 622, a third portion 623, and a fourth portion 624. Likewise, the power rail 630 includes a first portion 631 having at least one flared end 635, a second portion 632 having at least one flared end 635, a third portion 633 having at least one flared end 635, and a fourth portion 634 having at least one flared end 635. In this manner, the portion of the support system 600 can be similar to and/or substantially the same as the portion of the support system 500 described above with reference to FIG. 6. The portion of the support system 600 can differ from the portion of the support system 500, however, in the arrangement of the switch 640. For example, as shown in FIG. 7, the switch 640 includes a first support track portion 641 and a second support track portion 651, and a first power rail portion 643 and a second power rail portion 653.

Each end of the power rail portions 643 and 653 of the switch 640 forms a flare 645 and 655, respectively. Although not shown in FIG. 7, the switch 640 may also include a mounting frame and/or plate that supports all elements of the switch 640 and enables the elements to move together when performing one or more switching actions. As described above with reference to FIG. 2, the flared ends 635 of the power rail portions 631, 632, 633, and 634 and the flared ends 645 and 655 of the power rail portions 643 and 653, respectively, of the switch 640 can facilitate a movement of one or more electrical collectors of a trolley between the power rail portions 631, 632, 633, and/or 634 and the power rail portions 643 and 653 of the switch 640. As shown, each power rail portion 631, 632, 633, and 634 of the power rail 630 and the power rail portion 643 of the switch 640 includes and/or is electrically coupled to an electrical line feed 636. Thus, each power rail portion 631, 632, 633, 634, and/or 643 can be independently connected (i.e., electrically) to a power source (not shown in FIG. 7). As described above with reference to the trolley 210 illustrated in FIG. 2, in some embodiments, a trolley can include, for example, a first collector and a second collector. In this manner, as the trolley is advanced onto the switch, a first collector can remain in electrical contact with a power rail portion (e.g., the first portion 631) while the second collector can transition onto the power rail portion 643 of the switch 640. Thus, electric power can be supplied (e.g., selectively or continuously) to the trolley as the trolley moves onto the switch 640, as described above with reference to the portion of the support system 500.

As described above with reference to the support systems 100, 200, 300, 400, and/or 500, the switch 640 is configured to be moved relative to the support track 620 and the power rail 630 to transition the portion of the support system 600 between one or more configurations. For example, as described above, a user can manipulate a control device to send a control signal to the switch 640 and in response, the switch 640 can be moved (e.g., via an electromechanical device such as a motor) relative to the support track 620 and the power rail 630 between any number of linear positions. As shown, for example, in FIG. 7, the switch 640 can be in a first linear position (e.g., a first configuration), in which the first support track portion 641 and first power rail portion 643 of the switch 640 are aligned with the first portion 621 and second portion 622 of the support track 620 and the first portion 631 and the second portion 632 of the power rail 630, respectively, while the second support track portion 651 and second power rail portion 653 of the switch 640 are aligned with the third portion 623 and fourth portion 624 of the support track 620 and the third portion 633 and the fourth portion 634 of the power rail 630, respectively. In some instances, the switch 640 can be moved, for example, to a second linear position (e.g., a second configuration), in which the first support track portion 641 and the first power rail portion 643 of the switch 640 are aligned with the third portion 623 and the fourth portion 624 of the support track 620 and the third portion 633 and the fourth portion 634 of the power rail 630, respectively, while the second track portion 651 and the second power rail portion 653 of the switch 640 are not aligned with a portion of the support track 620 and power rail 630, respectively. Conversely, in other instances, the switch 640 can be moved, for example, to a third linear position (e.g., a third configuration), in which the second support track portion 651 and the second power rail portion 653 of the switch 640 are aligned with the first portion 621 and the second portion 622 of the support track 620 and the first portion 631 and the second portion 632 of the power rail 630, respectively, while the first track portion 641 and the first power rail portion 643 of the switch 640 are not aligned with a portion of the support track 620 and power rail 630, respectively.

Thus, as described above with reference to the support systems 400 and/or 500, the switch 640 can be configured to transition between the first linear position, the second linear position, and the third linear position to "switch" and/or operably couple any suitable portion of the support track and any suitable portion of the power rail to allow the trolley to be moved therebetween. While the switch 640 is described above as being moved between the first linear position, the second linear position, and the third linear position, in some embodiments, the switch 640 can be moved, for example, to a fourth linear position, a fifth linear position, etc. Similarly stated, a support system can include any suitable number of support track portions and power rail portions and can include a switch configured to move through any suitable number of positions to operably couple the portions of the support track and the portions of the power rail, respectively, in any suitable manner.

Figure 8:
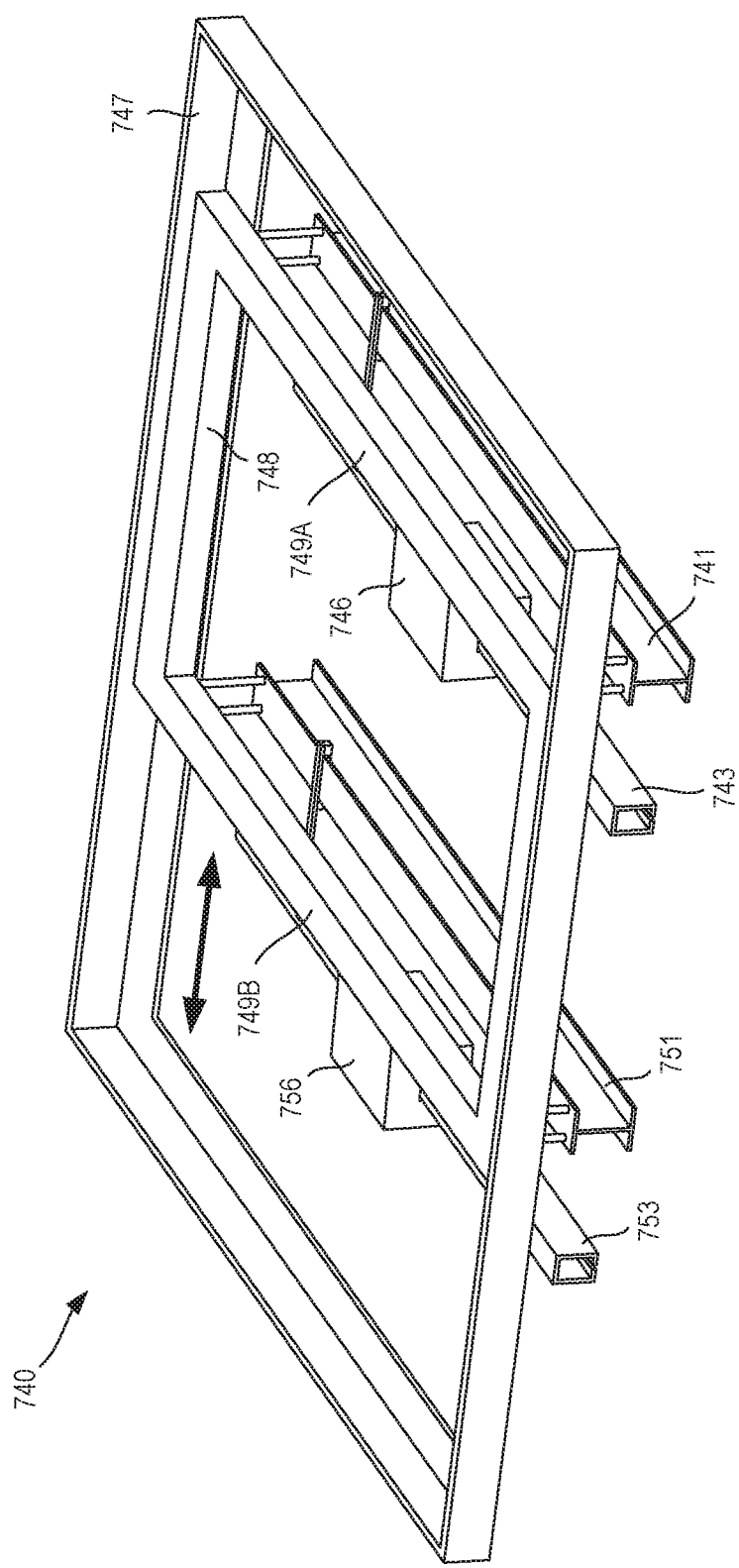

FIG. 8 is a schematic illustration of a switch 740 configured for use within a portion of a support system according to an embodiment. In some embodiments, the switch 740 can be substantially similar, at least in part, to the switch 640 described above with reference to FIG. 7. In other embodiments, the switch 740 can be similar to or substantially the same as any of the switches described herein (e.g., the switches 140, 240, 340, 440, and/or 540). In this manner, the switch 740 can be configured to at least temporarily support and/or suspend a trolley or the like (e.g., the trolley described in the '627 publication incorporated by reference hereinabove) and can provide a means and/or ability to "switch" between multiple support track portions of the support system (e.g., as described in detail above with reference to the switch 640 of FIG. 7).

The switch 740 includes a first support track portion 741 and a second support track portion 751, and a first power rail portion 743 and a second power rail portion 753, as described above with reference to the switch 640 of FIG. 7. In the embodiment shown in FIG. 8, the support track portions 741 and 751 are each arranged and/or configured as an "I" beam from which a trolley can be suspended (e.g., as described in detail in the '627 publication). The power rail portions 743 and 753 are each arranged and/or configured as a substantially hollow tube having at least one electrically conductive surface. In some embodiments, for example, the power rail portions 743 and 753 can be similar to and/or substantially the same as the power rail described in detail in the '627 publication. The first power rail portion 743 is coupled to the first support track portion 741 of the switch 740 and arranged such that the first power rail portion 743 is substantially parallel to the first support track portion 741. Likewise, the second power rail portion 753 is coupled to the second support track portion 751 of the switch 740 and arranged such that the second power rail portion 753 is substantially parallel to the second support track portion 751. Moreover, as shown in FIG. 8, the first power rail portion 743 and the second power rail portion 753 each include and/or are electrically connected to an electrical line feed 746 and 756, respectively. Accordingly, electrical power can be provided to the first power rail portion 743 and/or the second power rail portion 753 independently.

The switch 740 also includes a guide structure 747, a mounting structure 748, and a drive system (not shown in FIG. 8) configured to move the mounting structure 748 relative to and/or along a path defined by the guide structure 747. The guide structure 747 can be any suitable shape, size, and/or configuration. For example, in some embodiments, the guide structure 747 can be coupled, for example, to a ceiling, building structure, frame, etc. and can be configured to define a path along which the mounting structure 748 can be moved. Although not shown in FIG. 8, the guide structure 747 can include and/or can be coupled to one or more motors, tracks, wheels, drive assemblies, pulleys, etc. configured to move the mounting structure 748 relative to the guide structure 747 (e.g., along one or more surfaces).

The mounting structure 748 can be any suitable shape, size, and/or configuration. For example, in some embodiments, the mounting structure 748 can be a frame or the like movably coupled to, movably disposed on, and/or otherwise selectively engaged with the guide structure 747. For example, although not shown in FIG. 8, in some embodiments, the guide structure 747 can include a track and/or surface in contact with and/or supporting a portion of the mounting structure 748 and along which the mounting structure 748 can be moved in response to an activation of a motor, pulley system, drive assembly, linkage, movement mechanism, and/or the like. In such embodiments, the motor, drive assembly, etc. can receive a signal from a controller (e.g., a controller included in the trolley, a remote controller manipulated by a user, and/or the like) and based on receiving an electronic signal and/or a flow of electric current can move the mounting structure 748 along a path defined by the guide structure 747. In some embodiments, the arrangement of the guide structure 747 and the mounting structure 748 can allow for movement of the mounting structure 748 in one-dimension, two-dimensions, and/or three-dimensions. In other words, the mounting structure 748 can be moved in a direction along one axis, along two axes, and/or along three axes.

As shown in FIG. 8, the support track portions 741 and 751 are each coupled to and/or suspended from a mounting structure 748. More specifically, in the embodiment shown in FIG. 8, the mounting structure 748 can include a first coupling member 749A configured to couple to and/or to suspend the first support track portion 741 and a second coupling member 749B configured to couple to and/or to suspend the second support track portion 742. Accordingly, with the power rail portions 743 and 753 coupled to the support track portions 741 and 751, respectively, and with the support track portions 741 and 751 coupled to and/or suspended from the coupling members 749A and 749B, respectively, movement of the mounting structure 748 results in a similar movement of the support track portions 741 and 751 and the power rail portions 743 and 753.

As described above with reference to the portion of the support system 600, the switch 740 can be included in a support system including any suitable number of support track portions and power rail portions. In this manner, the switch 740 can be disposed in such a support system to operably couple multiple track portions and/or multiple power rail portions (as described above with reference to the support system 600). More specifically, the switch 740 can be configured to move (e.g., linearly) between any suitable number of positions to "switch" and/or operably couple any suitable portion of the support track and any suitable portion of the power rail to allow the trolley to be moved therebetween. Thus, the switch 740 can be configured to allow one or more trolleys to be switched from, for example, one tack or path to a different track or path.

Figure 9:
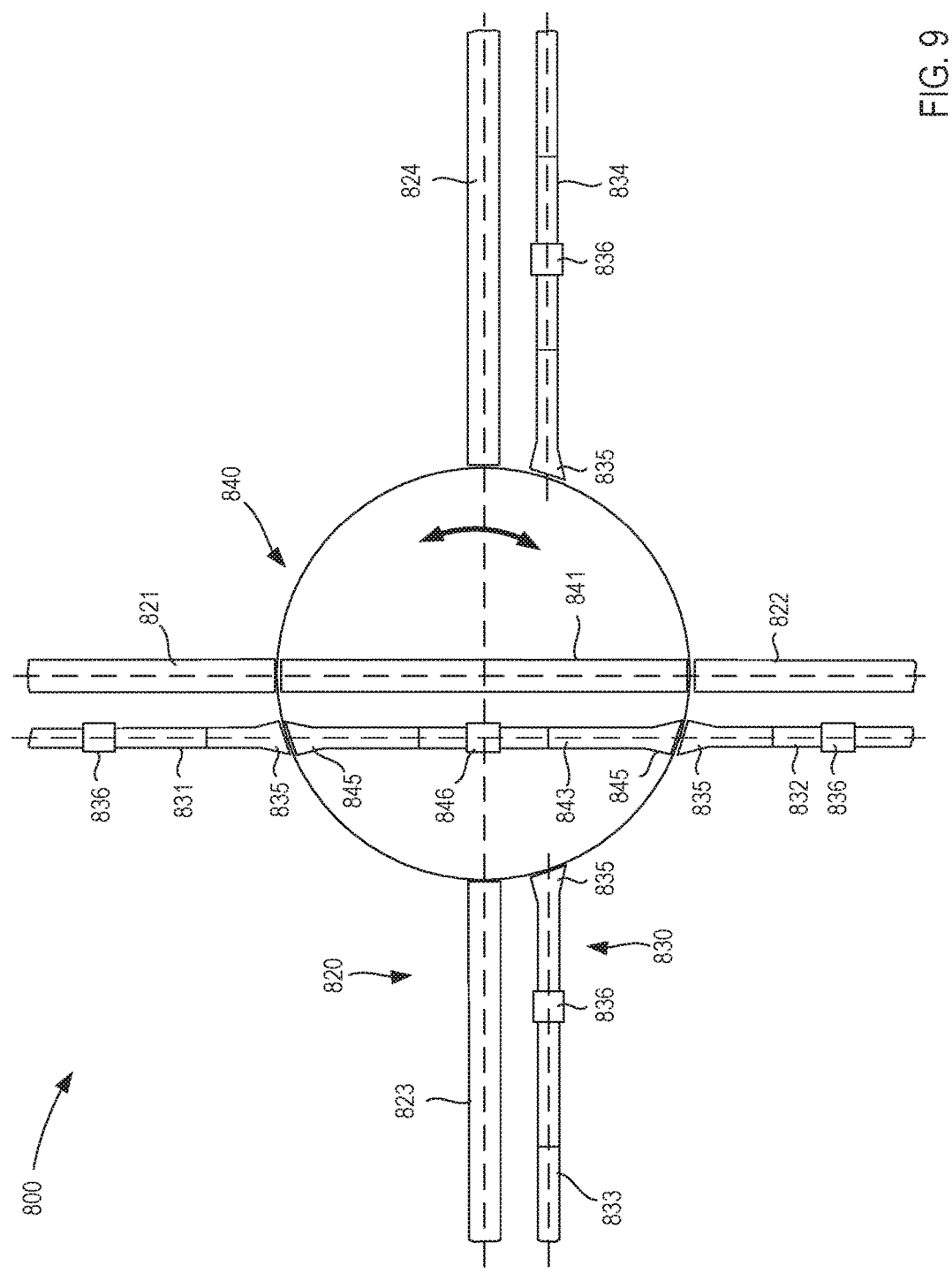

While the switches 440, 540, 640, and 740 are shown and described above as being translated or slid relative to the support tracks (420, 520, 620, and 720) and the power rails (430, 530, 630, and 730), respectively, in other embodiments, a switch can be moved in a rotational motion relative to a support track and/or power rail. For example, FIG. 9 is a schematic illustration of a portion of a support system 800 according to another embodiment. In some embodiments, the portion of the support system 800 can be substantially similar, at least in part, to the support system 100 described above with reference to FIG. 1. For example, the portion of the support system 800 includes a support track 820, a power rail 830, and a switch 840. Although not shown in FIG. 9, in some embodiments, the support track 820 can be configured to support a trolley or the like included in the support system 800. Similarly, the power rail 830 can be configured to provide a flow of electrical current to a portion of the trolley (not shown in FIG. 9). Thus, the portion of the support system 800 can be used to, for example, support a trolley, which in turn, can support at least a portion of a patient's weight during gait therapy and/or the like.

As shown in FIG. 9, the support track 820 includes a first portion 821, a second portion 822, a third portion 823, and a fourth portion 824. The power rail 830 includes a first portion 831 having at least one flared end 835, a second portion 832 having at least one flared end 835, a third portion 833 having at least one flared end 835, and a fourth portion 834 having at least one flared end 835. The switch 840 includes a support track portion 841 and a power rail portion 843. Each end of the power rail portion 843 includes and/or forms a flare 845. As described above with reference to FIG. 2, the flared ends 835 of the first portion 831 and second portion 832 of the power rail 830 and the flared ends 845 of the power rail portion 843 of the switch 840 can facilitate a movement of one or more electrical collectors of the trolley between the first portion 831 and/or second portion 832 of the power rail 830 and the power rail portion 843 of the switch 840. Moreover, as shown in FIG. 9, each portion 831, 832, 833, and 834 of the power rail 830 includes an electrical line feed 836. That is to say, each portion 831, 832, 833, and 834 of the power rail 830 can be independently connected (i.e., electrically) to a power source (not shown in FIG. 9). Similarly, the power rail portion 843 of the switch 840 includes an electrical line feed 846 configured to electrically connect the power rail portion 843 of the switch 840 to the power source.

As described above with reference to the support system 100 of FIG. 1, the switch 840 is configured to be moved relative to the support track 820 and the power rail 830 to transition the portion of the support system 800 between a first configuration and a second configuration. For example, as described above with reference to the support system 100, a user can manipulate a control device such as a personal computer, laptop, tablet, smartphone, and/or any other remote control device to send a control signal to the switch 840. In response to the control signal, the switch 840 can be rotated (e.g., via an electromechanical device such as a motor) relative to the support track 820 and the power rail 830 between a first angular (rotational) position and/or orientation and a second angular position and/or orientation. More specifically, in this embodiment, the control signal can result in the support track portion 841 being rotated about a central axis (not shown in FIG. 9). In other words, the switch 840 can be arranged, for example, as a turntable or the like.

For example, as shown in FIG. 9, the switch 840 can be placed in a first angular position and/or orientation (e.g., in response to receiving a control signal) such that the support track portion 841 of the switch 840 operatively couples the first portion 821 of the support track 820 to the second portion 822 of the support track 820 and the power rail portion 843 operatively couples the first portion 831 of the power rail 830 to the second portion 832 of the power rail 830. Thus, a trolley (not shown in FIG. 9) can be moved along the first portion 821 of the support track 820 and the support track portion 841 of the switch 840 to the second portion 822 of the support track 820. Similarly, one or more electrical collectors of the trolley can be moved along the first portion 831 of the power rail 830 and the power rail portion 843 of the switch 840 to the second portion 832 of the power rail 830. In other instances, the switch 840 can be placed in a second angular position and/or orientation (not shown in FIG. 9) such that the trolley can be moved along the third portion 823 of the support track 820 and the support track portion 841 of the switch 840 to the fourth portion 824 of the support track 820 while the one or more electrical collectors is moved along the third portion 833 of the power rail 830 and the power rail portion 843 of the switch 840 to the fourth portion 834 of the power rail 830.

While the switch 840 is described above as being moved between a first angular position and a second angular position, in some embodiments, the switch 840 can be moved, for example, to a third angular position. For example, in some embodiments, the support track 820 and the power rail 830 can each include a fifth portion and sixth portion, respectively. In this manner, the switch 840 can be configured to transition the support system between a first configuration corresponding to a first path along which the trolley can move, a second configuration corresponding to a second path along which the trolley can move, and a third configuration corresponding to a third path along which the trolley can move. In this manner, the switch 840 can be placed in the third angular position to transition the support system 800 to, for example, the third configuration, as described above with reference to the support system 300 of FIG. 3.

Figure 10:
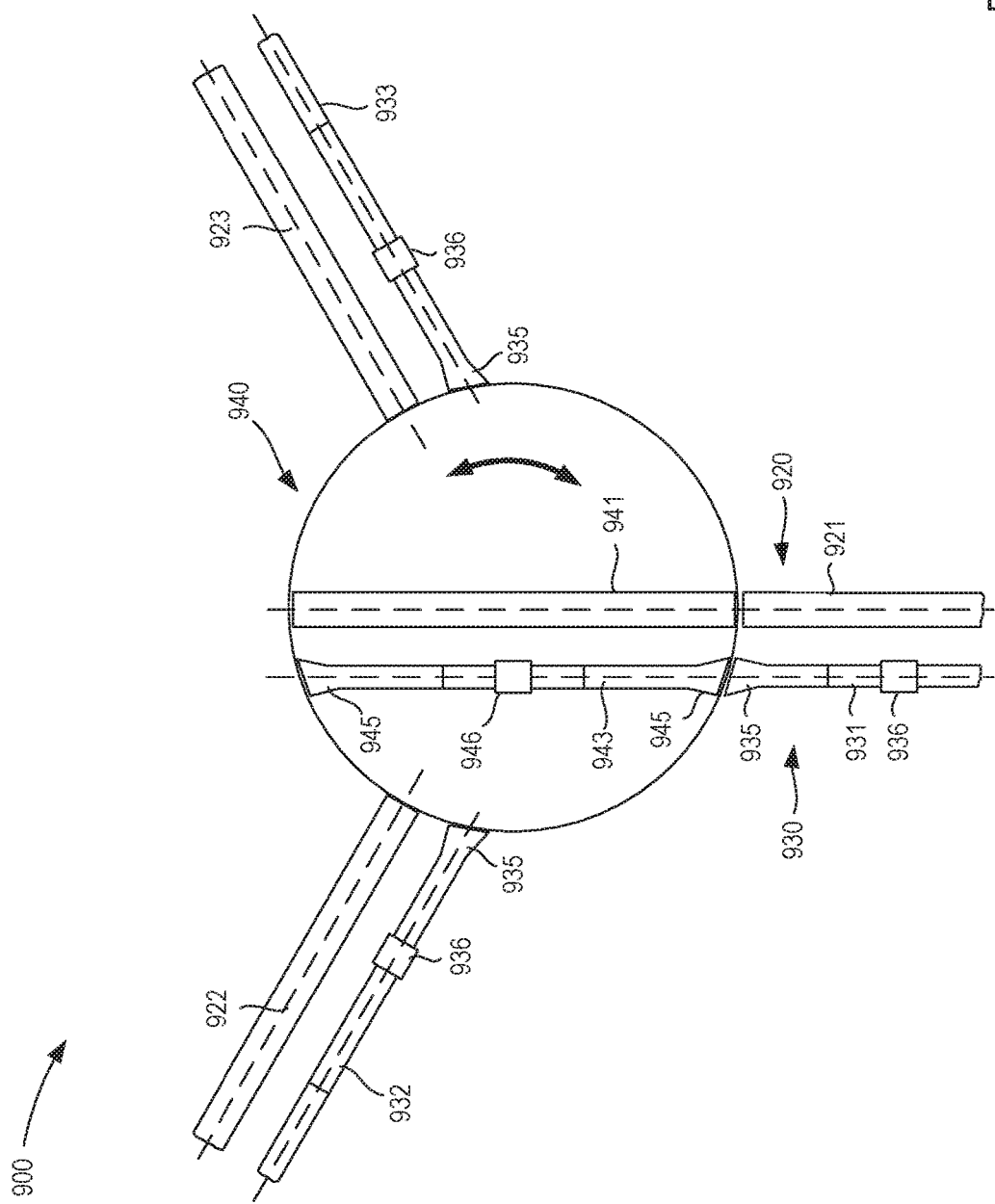

While the switch 840 is shown and described above with reference to FIG. 9 as being rotated between a first position and a second position to couple parallel track portions and rail portions (e.g., the track portion 821 and rail portion 831 to track portion 822 and rail portion 832, respectively, or the track portion 823 and rail portion 833 to track portion 824 and rail portion 834, respectively), in other embodiments, a switch can be moved in a rotational motion to couple any number of support track and/or power rail portions or segments in any suitable arrangement. For example, FIG. 10 is a schematic illustration of a portion of a support system 900 according to another embodiment. In some embodiments, the portion of the support system 900 can be substantially similar, at least in part, to the support system 800 described above with reference to FIG. 9. For example, the portion of the support system 900 includes a support track 920, a power rail 930, and a switch 940. Although not shown in FIG. 10, in some embodiments, the support track 920 can be configured to support a trolley or the like included in the support system 900. Similarly, the power rail 930 can be configured to provide a flow of electrical current to a portion of the trolley (not shown in FIG. 10). Thus, the portion of the support system 900 can be used to, for example, support a trolley, which in turn, can support at least a portion of a patient's weight during gait therapy and/or the like, as described in detail in the '627 publication incorporated by reference hereinabove.

As shown in FIG. 10, the support track 920 includes a first portion 921, a second portion 922, and a third portion 923. The power rail 930 includes a first portion 931 having at least one flared end 935, a second portion 932 having at least one flared end 935, and a third portion 933 having at least one flared end 935. The switch 940 includes a support track portion 941 and a power rail portion 943. Each end of the power rail portion 943 includes and/or forms a flare 945. As described above with reference to FIG. 2, the flared ends 935 of the portions 931, 932, and 933 of the power rail 930 and the flared ends 945 of the power rail portion 943 of the switch 940 can facilitate a movement of one or more electrical collectors of the trolley between the portions 931, 932, and/or 933 of the power rail 930 and the power rail portion 943 of the switch 940. Moreover, as shown in FIG. 10, each portion 931, 932, and 933 of the power rail 930 includes an electrical line feed 936. That is to say, each portion 931, 932, and 933 of the power rail 930 can be independently connected (i.e., electrically) to a power source (not shown in FIG. 10). Similarly, the power rail portion 943 of the switch 940 includes an electrical line feed 946 configured to electrically connect the power rail portion 943 of the switch 940 to the power source.

As described above with reference to the support system 100 of FIG. 1, the switch 940 is configured to be moved relative to the support track 920 and the power rail 930 to transition the portion of the support system 900 between a one or more configuration. For example, as described above with reference to the support system 100, a user can manipulate a control device such as a personal computer, laptop, tablet, smartphone, and/or any other remote control device to send a control signal to the switch 940. In response to the control signal, the switch 940 can be rotated (e.g., via an electromechanical device such as a motor) relative to the support track 920 and the power rail 930 between a first angular (rotational) position and/or orientation and a second angular position and/or orientation. More specifically, in this embodiment, the control signal can result in the support track portion 941 and the power rail portion 943 of the switch being rotated about a central axis (not shown in FIG. 10). In other words, the switch 940 can be arranged, for example, as a turntable or the like. In other instances, the switch can be manually rotated via a force exerted on a portion of the switch.

For example, as shown in FIG. 10, the switch 940 can be placed in a first angular position and/or orientation (e.g., in response to receiving a control signal) such that the support track portion 941 of the switch 940 is aligned with the first portion 921 of the support track 920 and the power rail portion 943 of the switch 940 is aligned with the first portion 931 of the power rail 930. Thus, a trolley (not shown in FIG. 10) can move along the first portion 921 of the support track 920 and one or more electrical collectors of the trolley can move along the first portion 931 of the power rail 930 and after reaching the ends thereof, the trolley can move onto and/or along the support track portion 941 and the power rail portion 943 of the switch 940. With the trolley suspended from and in electrical contact with the switch 940, the user can provide an input (e.g., an electrical and/or electronic input, a mechanical input, etc.) to move the switch 940 to a second angular position and/or orientation such that the support track portion 941 and the power rail portion 943 of the switch 940 are substantially aligned with, for example, the second portion 922 of the support track 920 and the second portion 932 of the power rail 930, respectively. In other instances, the switch 940 can be placed in a third angular position such that the support track portion 941 and the power rail portion 943 of the switch 940 are substantially aligned with, for example, the third portion 923 of the support track 920 and the third portion 933 of the power rail 930, respectively.

While the switch 940 is described above as being moved between the first angular position, the second angular position, and the third angular position, in other embodiments, the switch 940 can be moved to and/or between any suitable number of angular positions and/or orientations to align the support track portion 941 and the power rail portion 943 of the switch 940 with any suitable number of track portions and power rail portions, respectively. For example, in some embodiments, a support system can include two, three, four, five, six, seven, eight, nine, ten, or more track and power rail portions. Moreover, in such instances, the switch can include any suitable device and/or mechanism configured to rotate the switch 940 with sufficient precision to rotate the switch 940 through relatively small angular position changes (e.g., five degrees, 10 degrees, 15 degrees, 30 degrees, 45 degrees, etc.). Thus, in such embodiments, a trolley and one or more collector(s) thereof can be moved along any suitable portion of a support track and a power rail, respectively, and onto the support track portion 941 and power rail portion 943 of the switch 940, which in turn, can be placed in any suitable angular position to align the support track portion 941 and the power rail portion 943 of the switch 940 with any suitable portion of the support track and power rail, respectively.

Figure 11:
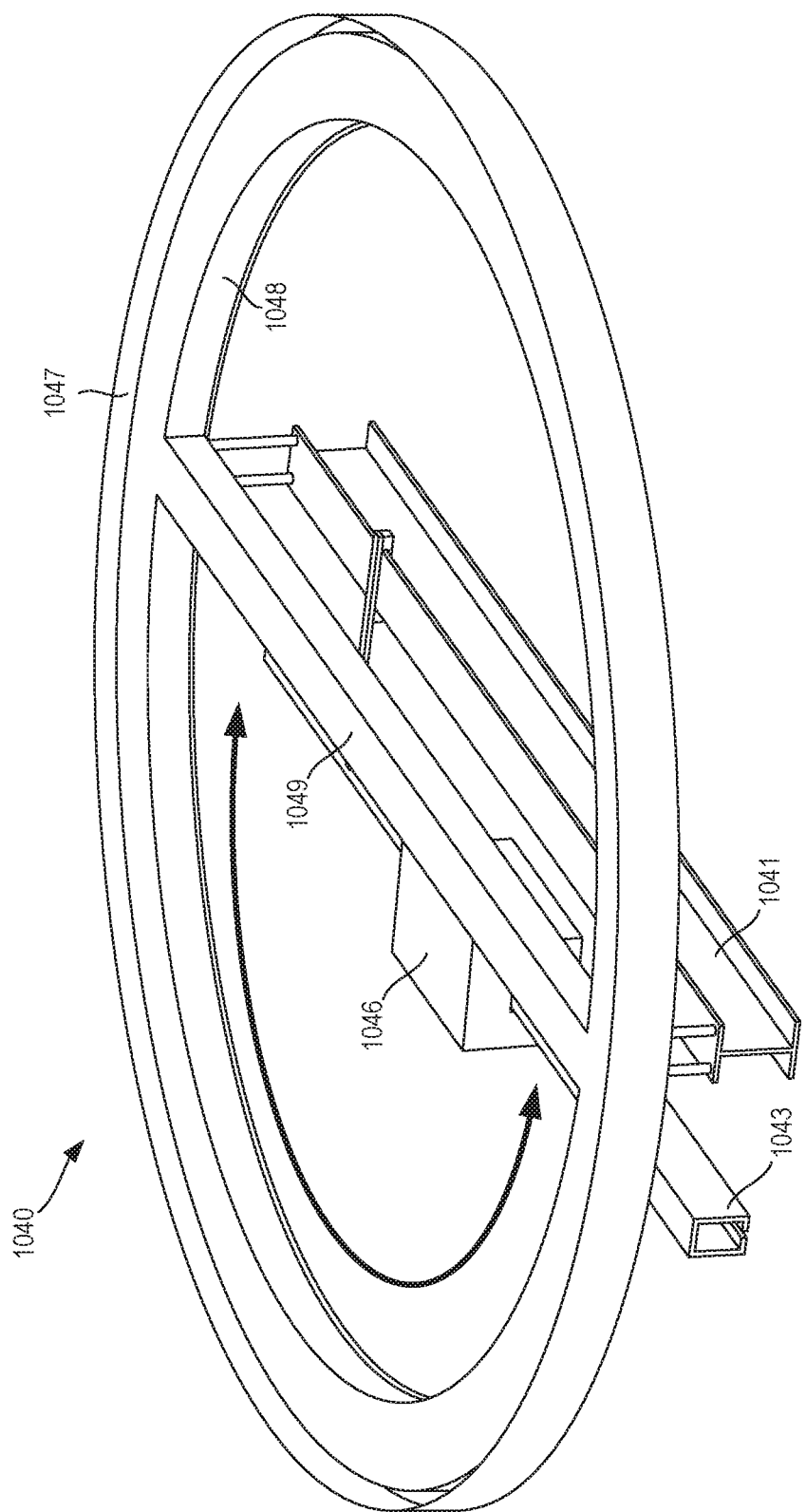

FIG. 11 is a schematic illustration of a switch 1040 configured for use within a portion of a support system according to an embodiment. In some embodiments, the switch 1040 can be substantially similar, at least in part, to the switch 840 described above with reference to FIG. 9 and/or the switch 940 described above with reference to FIG. 10. In other embodiments, the switch 1040 can be similar to or substantially the same as any of the switches described herein. In this manner, the switch 1040 can be configured to at least temporarily support and/or suspend a trolley or the like (e.g., the trolley described in the '627 publication incorporated by reference hereinabove) and can provide a means and/or ability to "switch" between multiple support track portions of the support system (e.g., as described in detail above with reference to the switches 840 and/or 940).

The switch 1040 includes a support track portion 1041 and a power rail portion 1043, as described above with reference to the switches 840 and 940. In some embodiments, the switch 1040 can be substantially similar in form and/or function to the switch 740. For example, the support track portion 1041 of the switch 1040 is arranged and/or configured as an "I" beam from which a trolley can be suspended (e.g., as described in detail in the '627 publication) and the power rail portion 1043 is arranged and/or configured as a substantially hollow tube having at least one electrically conductive surface. The power rail portion 1043 is coupled to the support track portion 1041 and arranged such that the power rail portion 1043 is substantially parallel to the support track portion 1041. Moreover, as shown in FIG. 11, the power rail portion 1043 includes and/or is electrically connected to an electrical line feed 1046 configured to supply a flow of electric power to the power rail portion 1043.

As described above with reference to the switch 740, the switch 1040 also includes a guide structure 1047, a mounting structure 1048, and a drive system (not shown in FIG. 11) configured to move the mounting structure 1048 relative to and/or along a path defined by the guide structure 1047. The guide structure 1047 and the mounting structure 1048 each can be any suitable shape, size, and/or configuration. In some embodiments, the guide structure 1047 and the mounting structure 1048 can be substantially similar in at least form and/or function to the guide structure 747 and mounting structure 748, respectively, described above with reference to FIG. 8. In the embodiment shown in FIG. 11, however, the guide structure 1047 and mounting structure 1048 can differ from the guide structure 747 and mounting structure 748, respectively, by being configured for rotational movement rather than translational movement. That is to say, the mounting structure 1048 can be a frame or the like rotatably coupled to and/or rotatably disposed on the guide structure 1047. As such, a motor, drive assembly, etc. can receive a signal from a controller (e.g., a controller included in the trolley, a remote controller manipulated by a user, and/or the like) and based on receiving an electronic signal and/or a flow of electric current can rotate the mounting structure 1048 along a rotational path defined by the guide structure 1047.

As described above with reference to the switch 740, the support track portion 1041 is coupled to and/or suspended from a coupling member 1049 of the mounting portion 1048. Accordingly, with the power rail portion 1043 coupled to the support track portion 1041 and with the support track portion 1041 coupled to and/or suspended from the coupling member 1049 movement of the mounting structure 1048 results in a similar movement of the support track portion 1041 and the power rail portion 1043.

As described above with reference to the portion of the support systems 800 and/or 900, the switch 1040 can be included in a support system including any suitable number of support track portions and power rail portions. In this manner, the switch 1040 can be disposed in such a support system to operably couple multiple track portions and/or multiple power rail portions. More specifically, the switch 1040 can be configured to move between any suitable number of angular (e.g., rotational) positions to "switch" and/or operably couple any suitable portion of the support track and any suitable portion of the power rail to allow the trolley to be moved therebetween. Thus, the switch 1040 can be configured to allow one or more trolleys to be switched from, for example, one tack or path to a different track or path.

Referring now to FIG. 12, a flowchart is shown illustrating a method 10 of using a body weight support system according to an embodiment. The body weight support system can be substantially similar to any of those described herein. For example, the body weight support system (also referred to herein as "support system") can be substantially similar to the support system 100, 200, 300, 400, 500, 600, 800, and/or 900 described herein. The support system can include a support track having at least a first support track portion and a second support track portion, a power rail having at least a first power rail portion and a second power rail portion, and a switch. The support track portions and the power rail portions can be substantially similar to any of those described herein. The switch can include at least one support track portion and at least one power rail portion. In some embodiments, the switch can be substantially similar to any of the switches 140, 340, 440, 540, 640, 740, 840, 940, and/or 1040 described herein. In this manner, the support system can be used to support and/or suspend a trolley, configured to support at least a portion of a body weight of a patient, and the switch can be transitioned between any suitable number of configurations and/or positions to operably couple one or more discontinuous portions of the support track and power rail, as described in further detail herein.

The method 10 includes moving a trolley from a first position, in which the trolley is movably suspended from the first support track portion and is in electrical contact with the first power rail portion, to a second position, in which the trolley is movably suspended from the support track portion of the switch and is in electrical contact with a power rail portion of the switch, at 11. For example, in some embodiments, the support track portion and the power rail portion of the switch can be substantially aligned with, for example the first support track portion and the first power rail portion, respectively, when the switch is in the first configuration. Accordingly, trolley can receive a flow of electrical power from at least one of the first power rail portion or the power rail portion of the switch and in response, the trolley can be advanced from the first position to the second position. In some embodiments, the arrangement of the trolley, the first power rail portion, and the power rail portion of the switch can be such that the trolley receives a substantially uninterrupted flow of electric power. For example, in some embodiments, the trolley can include two or more electric collectors or the like, as described above with reference to the trolley 210 in FIG. 2. In addition, the arrangement of the trolley, the first support track portion, and the support track portion of the switch can be such that a drive assembly or the like of the trolley is advanced along the first support track portion and onto or along the support track portion of the switch as the trolley is moved from the first position to the second position.

The switch is transitioned from a first configuration to a second configuration, at 12. In some embodiments, for example, the support track portion of the switch and the power rail portion of the switch can each be aligned with the first support track portion and the first power rail portion, respectively. Thus, as described above, the trolley can be advanced from the first position to the second position. After the trolley is suspended from the switch, the switch can be transitioned from the first configuration to the second configuration. As described above with reference to the support systems and/or switches above, the support track portion of the switch and the power rail portion of the switch can each be aligned with the second support track portion and the second power rail portion, respectively. In some embodiments, transitioning the switch can include moving the switch in a translational motion or a rotational motion from the first configuration to the second configuration. In other embodiments, transitioning the switch from the first configuration to the second configuration can include reconfiguring and/or rearranging the switch in any suitable manner.

The trolley is then moved from the second position to a third position such that the trolley is movably suspended from the second support track portion and is in electrical contact with the second power rail portion, at 13. As described above with reference to the support systems and/or switches herein, transitioning the switch from the first configuration to the second configuration can include transitioning the switch in any suitable manner to align the support track portion of the switch and the power rail portion of the switch with any suitable portion of the support track and/or power rail, respectively. For example, in some embodiments, a support system can include two support track portions and power rail portions, three support track portions and power rail portions, four support track portions and power rail portions, five support track portions and power rail portions, etc.

Although not specifically shown or described herein, the support systems 100, 200, 300, 400, 500, 600, 800, and/or 900 can include any suitable support track and/or power rail. For example, in some embodiments, any of the support systems and/or portions thereof described herein can include one or more support track portions and one or more power rail portions that are substantially similar to the support track portions 741, 751, and/or 1041 (e.g., an "I" beam configuration) and the power rail portions 743, 753, and/or 1043 (e.g., a hollow tube having one or more conductive surfaces), respectively.

In some embodiments, the power rails and/or power rail portions can be coupled to one or more power sources configured to provide a flow of electrical current (e.g., electrical power) to the power rails. In some embodiments, the power rails can include any suitable transformer, converter, conditioner, capacitor, resistor, insulator, and/or the like such that the power rail can receive the flow of electrical current from the power source and transfer at least a portion of the flow of electrical current to the trolley. The power rails can include one or more electrical conductors to deliver, for example, single or multiphase electrical power to one or more trolleys. For example, in some embodiments, a power rail can be a substantially tubular rail configured to receive a conductive portion of an electronic system of the trolley. More specifically, the power rail can include one or more conductive surfaces disposed within an inner portion of the tubular rail along which a conductive member of the electronic system (e.g., an electrical collector) moves. In this manner, the power rails can transmit a flow of electrical current from the power source to the electronic system of the trolley, as described above. Furthermore, the arrangement of the support track portions, power rail portions, and trolleys is such that movement of a trolley along the length of the support track portion is not hindered or limited by a bundle of cables and/or other restrictions associated with providing electrical power to the trolley, as described above with reference to known support systems.

Figure 13:
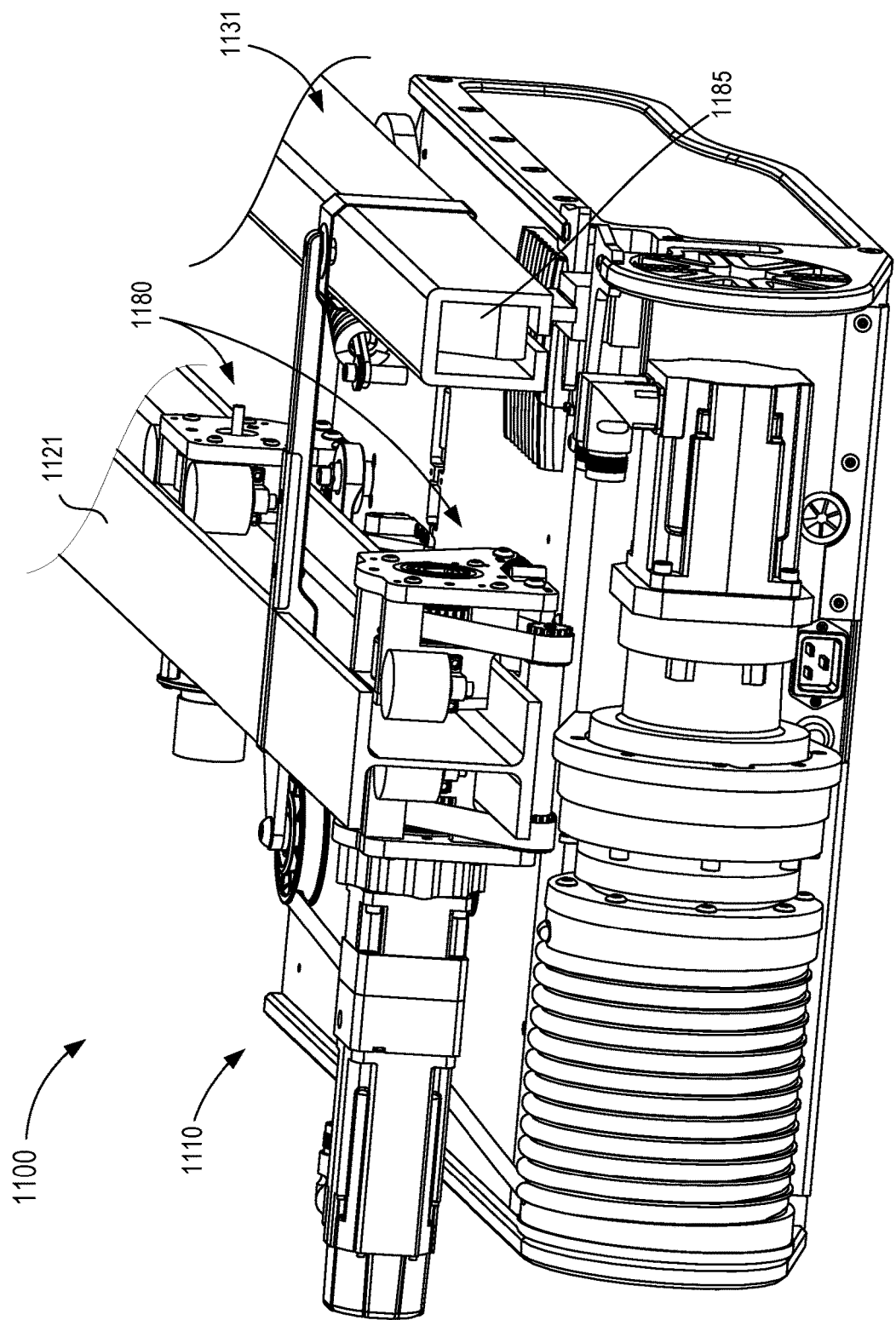
FIG. 13 is a rear perspective view of a body weight support system including a trolley, a support track, and a power rail, according to an embodiment.

By way of example, any of the support tracks, power rails, and/or a trolleys can be similar to or substantially the same as the support tracks, power rails, and/or trolleys described in the '627 publication incorporated herein by reference above. For example, FIG. 13 illustrates a support system 1100 according to an embodiment. The support system 1100 includes a trolley 1110, a support track 1121, and a power rail 1131.

As shown in FIG. 13, the trolley 1110 includes a drive system 1180 configured to movably couple the trolley 1110 to the support track 1121. The support track 1121, in turn, is configured to support the weight of the trolley 1110 and the weight of the patient utilizing the support system 1100. Although the support track 1121 is shown as having an I-shape, the support track 1121 can be any suitable shape.

Furthermore, while the support track 1121 is shown as being substantially linear, the support track 1121 can extend in a curvilinear direction. In other embodiments, the support track 1121 can be arranged in a closed loop such as, for example, circular, oval, oblong, square, or the like. As shown in FIG. 13, the power rail 1131 is coupled to the support track 1121 and extends substantially parallel to the support track 1121. The power rail 1131 is at least electrically coupled to the trolley 1110 and configured to transfer a flow of electrical current from a power source (not shown) to the trolley 1110. More particularly, the trolley 1110 includes an electrical collector 1185 that is configured to be placed in physical and/or electrical contact with the power rail 1131 and/or at least a portion thereof. The collector 1185 can be any suitable shape, size, or configuration and can be formed from any suitable conductive material, such as, for example, iron, steel, or the like. In this example, the power rail 1131 is a substantially hollow tube that houses or substantially encloses one or more conductive portions (not shown) that are electrically coupled to a power source (not shown). In this manner, the collector 1185 can be disposed within the hollow tube of the power rail 1131 such that the collector 1185 is placed in electrical communication with the one or more conductive portions disposed within the hollow tube of the power rail 1131.

Any of the embodiments described herein can be configured to move a switch between positions via a motor, actuator, and/or any other electromechanical device. The motor, actuator, or other electromechanical device may be activated by a user via a wired or a wireless switch and/or control device. Any of the embodiments described herein can include one or more safety mechanism to prevent switching when a trolley is passing over a switch. For example, in some embodiments, a location of the trolley(s) on the track can be determined and the switching mechanism can be blocked if the trolley approaches the switch. Alternatively, the switch can have optic, magnetic, or electrical sensors to sense that the trolley is approaching the switch and to block the switching operation. Similarly, the embodiments described herein can prevent a trolley from traveling to the switch while the switch is in an undesirable position such that a portion of the support track is open or the like. In some embodiments, for example, a switch can include a mechanical barrier, which can move against the open track, or by an electromechanical operation, which is configured to set a barrier once the track is open, or when the switch is moving. Moreover, any of the embodiments described herein can be configured to send and/or provide feedback to a user, an operator, a patient, and/or the like that a switch operation is completed, and it is safe to move. The feedback can be given via an optical, audio, tactile, and/or other indication.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed is:

1. A body weight support system, comprising:
    a support track configured to movably suspend a trolley therefrom, the trolley configured to support at least a portion of a body weight of a patient;
    a power rail coupled to the support track, the power rail configured to receive an electrical collector of the trolley such that the electrical collector is in electrical contact with a powered conductor disposed in the power rail; and
    a switch having a support track portion and a power rail portion, the power rail portion of the switch configured to receive the electrical collector of the trolley such that the electrical collector is in electrical contact with a powered conductor disposed in the power rail portion of the switch, the switch configured to transition between a first configuration, in which (1) a first portion of the support track and the support track portion of the switch define a first path and (2) a first flared end of the power rail portion of the switch is disposed opposite a first flared end of the power rail, and a second configuration, in which (1) a second portion of the support track and the support track portion of the switch define a second path and (2) a second flared end of the power rail portion of the switch is disposed opposite a second flared end of the power rail,
    the trolley configured to receive a flow of electric power from at least one of the power rail or the power rail portion of the switch operable to move the trolley along the first path when the switch is in the first configuration and along the second path when the switch is in the second configuration.

2. The body weight support system of claim 1, wherein the first portion of the support track is discontinuous from the second portion of the support track.

3. The body weight support system of claim 1, wherein transitioning the switch from the first configuration to the second configuration includes moving the switch in a translational motion from a first position to a second position.

4. The body weight support system of claim 1, wherein the switch is configured to transition between the first configuration and the second configuration while the trolley is movably suspended from the support track.

5. The body weight support system of claim 1, wherein the switch is configured to transition between the first configuration and the second configuration while the trolley is movably suspended from the support track portion of the switch.

6. The body weight support system of claim 1, wherein the trolley includes a first electrical collector and a second electrical collector, at least one of the first electrical collector or the second electrical collector being maintained in electrical contact with at least one of the powered conductor disposed in the power rail or the powered conductor disposed in the power rail portion of the switch.

7. A body weight support system, comprising:
    a support track having a first portion and a second portion;
    a power rail coupled to the support track, the power rail including a powered conductor disposed within the power rail, the power rail having a first portion and a second portion, the first portion and the second portion each having a flared end;

a switch having a support track portion and a power rail portion, the power rail portion including a powered conductor disposed in the power rail, the switch configured to transition between a first configuration, in which (1) the first portion of the support track and the support track portion of the switch define at least a portion of a first path and (2) a first flared end of the power rail portion of the switch is disposed opposite the flared end of the first portion of the power rail, and a second configuration, in which (1) the second portion of the support track and the support track portion of the switch define at least a portion a second path and (2) a second flared end of the power rail portion of the switch is disposed opposite the flared end of the second portion of the power rail; and a trolley configured to be movably suspended from at least one of the support track or the support track portion of the switch, the trolley configured to support at least a portion of a body weight of a patient, the trolley including a first electrical collector and a second electrical collector movably disposed within at least one of the power rail or the power rail portion of the switch such that at least one of the first electrical collector or the second electrical collector is maintained in electrical contact with (1) at least one of the powered conductor in the first portion of the power rail or the powered conductor in the power rail portion of the switch when the switch is in the first configuration, or (2) at least one of the powered conductor in the second portion of the power rail or the powered conductor in the power rail portion of the switch when the switch is in the second configuration.

8. The body weight support system of claim 7, wherein the switch is disposed (1) between the first portion of the support track and the second portion of the support track and (2) between the first portion of the power rail and the second portion of the power rail.

9. The body weight support system of claim 7, wherein the trolley is configured to be suspended from the second portion of the support track and in electrical contact with the powered conductor in the second portion of the power rail when the trolley is in an unused configuration.

10. The body weight support system of claim 7, wherein the support track includes a third portion and the power rail includes a third portion, the support track portion of the switch includes a first support track portion and a second support track portion, the power rail portion of the switch includes a first power rail portion and a second power rail portion, the first portion of the support track, the third portion of the support track, and the first support track portion of the switch collectively define the first path when the switch is in the first configuration, and the first portion of the support track, the second portion of the support track, and the second support track portion of the switch collectively define the second path when the switch is in the second configuration.

11. The body weight support system of claim 10, wherein at least one of the first electrical collector or the second electrical collector of the trolley is maintained in electrical contact with (1) at least one of the powered conductor in the first portion of the power rail, the powered conductor in the third portion of the power rail, or the powered conductor in the first power rail portion of the switch when the switch is in the first configuration, or (2) at least one of the powered conductor in the first portion of the power rail, the powered conductor in the second portion of the power rail, or the powered conductor in the second power rail portion of the switch when the switch is in the second configuration.

12. The body weight support system of claim 10, wherein the first portion of the support track and the third portion of the support track are substantially parallel, the second portion of the support track is substantially nonparallel to the first portion of the support track and the third portion of the support track.

13. The body weight support system of claim 10, wherein the first portion of the support track and the third portion of the support track are substantially parallel, the second portion of the support track is substantially nonparallel to the first portion of the support track and the third portion of the support track, the first support track portion of the switch is substantially straight such that when the switch is in the first configuration, a first end and a second end of the first support track portion of the switch are aligned with the first portion of the support track and the third portion of the support track, respectively, and the second support track portion of the switch is substantially curved such that when the switch is in the second configuration, a first end and a second end of the second support track portion of the switch are aligned with the first portion of the support track and the second portion of the support track, respectively.

14. The body weight support system of claim 7, wherein the first power rail portion of the switch includes a first flared end and a second flared end and the second power rail portion of the switch includes a first flared end and a second flared end, the first flared end of the power rail portion of the switch being the first flared end of the first power rail portion of the switch and the second flared end of the power rail portion of the switch being the second flared end of the first power rail portion of the switch, the first flared end of the first power rail portion of the switch is disposed opposite the flared end of the first portion of the power rail and the second flared end of the first power rail portion of the switch is disposed opposite a flared end of the third portion of the power rail when the switch is in the first configuration, and the first flared end of the second power rail portion of the switch is disposed opposite the flared end of the first portion of the power rail and the second flared end of the second power rail portion of the switch is disposed opposite the flared end of the second portion of the power rail when the switch is in the second configuration.

15. The body weight support system of claim 7, wherein the flared end of the first portion of the power rail and the first flared end of the power rail portion of the switch are collectively configured to allow at least one of the first electrical collector or the second electrical collector of the trolley to move between the first portion of the power rail and the power rail portion of the switch as the trolley moves along the first path.

16. The body weight support system of claim 15, wherein the flared end of the second portion of the power rail and the second flared end of the power rail portion of the switch are collectively configured to allow at least one of the first electrical collector or the second electrical collector of the trolley to move between the second portion of the power rail and the power rail portion of the switch as the trolley moves along the second path.

17. The body weight support system of claim 1, wherein the first flared end of the power rail and the first flared end of the power rail portion of the switch are collectively configured to allow the electrical collector of the trolley to move between the power rail and the power rail portion of the switch as the trolley moves along the first path.

18. The body weight support system of claim 17, wherein the second flared end of the power rail and the second flared end of the power rail portion of the switch are collectively configured to allow the electrical collector of the trolley to move between the power rail and the power rail portion of the switch as the trolley moves along the second path.

\* \* \* \* \*